US008849291B2

(12) United States Patent
Yu et al.

(10) Patent No.: US 8,849,291 B2
(45) Date of Patent: *Sep. 30, 2014

(54) SUPPLEMENTAL NODE TRANSMISSION ASSISTANCE IN A WIRELESS COMMUNICATION NETWORK

(75) Inventors: Yi Yu, Irving, TX (US); Rose Hu, Irving, TX (US); Zhijun Cai, Irving, TX (US); Yi Song, Irving, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,108

(22) Filed: Jan. 27, 2012

(65) Prior Publication Data

US 2012/0127880 A1   May 24, 2012

Related U.S. Application Data

(63) Continuation of application No. 12/723,396, filed on Mar. 12, 2010.

(51) Int. Cl.
| | | |
|---|---|---|
| *H04W 72/00* | (2009.01) | |
| *H04W 48/20* | (2009.01) | |
| *H04W 72/08* | (2009.01) | |

(52) U.S. Cl.
CPC ............ *H04W 72/08* (2013.01); *H04W 48/20* (2013.01)
USPC ......................... 455/450; 455/451; 455/452.2

(58) Field of Classification Search
CPC .......... H04W 36/0055; H04W 36/165; H04W 36/30; H04W 40/36; H04W 40/22; H04W 40/34
USPC ......................... 455/450–453, 455, 436–444, 455/435.1–435.3, 67.11
See application file for complete search history.

(56) References Cited

U.S. PATENT DOCUMENTS 6,993,341 B2   1/2006   Hunzinger
7,756,520 B2   7/2010   Hashem et al.
(Continued)

FOREIGN PATENT DOCUMENTS

EP   2315477   4/2011
JP   2003-319457   11/2003
(Continued)

OTHER PUBLICATIONS

3GPP TR 36.300 V8.8.0 (Mar. 2009), Technical Report, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) Mar. 2009; pp. 1-157.

(Continued)

*Primary Examiner* — Wesley Kim
*Assistant Examiner* — Nam Huynh
(74) *Attorney, Agent, or Firm* — Fish & Richardson P.C.

(57) ABSTRACT

Supplemental node transmission assistance in a wireless network provides for transmissions between a wireless network and wireless user equipment in a first direction using a serving node of the wireless network while providing for transmissions between the wireless network and wireless user equipment in a second direction using a supplemental node of the wireless network. The supplemental node is selected based on providing better channel conditions between the network and the user equipment in the second direction than the serving node. The supplemental node thus provides transmission assistance for the serving node in order to provide the best available downlink and uplink communications between the user equipment and the network.

14 Claims, 10 Drawing Sheets

(56) References Cited

U.S. PATENT DOCUMENTS

| | | | | |
|---|---|---|---|---|
| 8,358,624 | B1* | 1/2013 | Ghaus et al. | 370/331 |
| 2005/0094588 | A1 | 5/2005 | Wentink | |
| 2009/0040981 | A1* | 2/2009 | Agashe et al. | 370/331 |
| 2010/0216470 | A1* | 8/2010 | Pamp et al. | 455/436 |
| 2010/0323749 | A1* | 12/2010 | Lee et al. | 455/524 |

FOREIGN PATENT DOCUMENTS

| | | |
|---|---|---|
| JP | 2005-136458 | 5/2005 |
| JP | 2007-514367 | 5/2007 |
| JP | 2009-017547 | 1/2009 |
| JP | 2010-004501 | 1/2010 |
| JP | 2010-045547 | 2/2010 |
| JP | 2011-055194 | 3/2011 |
| JP | 2012-514903 | 6/2012 |
| WO | 2008/156246 | 12/2008 |
| WO | 2009/131898 | 10/2009 |
| WO | WO2009149757 A1 | 12/2009 |

OTHER PUBLICATIONS

3GPP TS 36.213 V8.6.0 (Mar. 2009), Technical Specification, 3rd Generation Partnership Project; Technical Specification Group Radio Access Network; Evolved Universal Terrestrial Radio Access (E-UTRA); Physical Layer Procedures (Release 8) Mar. 2009; pp. 1-77.

3GPP TS 36.331 V8.8.0 (Dec. 2009), Technical Specification, 3rd Generation Partnership Project; Technical Specification Group Radio Access Network; Evolved Universal Terrestrial Radio Access (E-UTRA) Radio Resource Control (RRC); Protocol specification (Release 8) Dec. 2009; pp. 1-150.

3GPP TS 36.814 V0.4.1 (Feb. 2009), Technical Report, 3rd Generation Partnership Project; Technical Specification Group Radio Access Network; Further Advancements for E-UTRA Physical Layer Aspects (Release 9) Feb. 2009; pp. 1-31.

Research in Motion UK Limited; "Performance Analysis of UE Associate in a Type-II Relay Network"; 3GPP TSG RAN WG1 Meeting #59 (R1-094462); Jeju, Korea; Nov. 9-13, 2009; 5 pages.

Research in Motion, UK Limited; "Type-II Relay Reference Signal Transmission and UE Association"; 3GPP TSG RAN WG1 Meeting #57bis; R1-092419; Los Angeles, USA; Jun. 29-Jul. 3, 2009; pp. 1-4.

Laneman, J.N., et al.; "Energy-Efficient Antenna Sharing and Relaying for Wireless Networks"; Wireless Communications and Networking Conference; 2000 IEEE Sep. 23-28, 2000; Piscataway, NJ; pp. 7-12.

Nokia et al.; "3rd Generation Partnership Project; Technical Specification Group Radio Access Network; HSPA Evolution (FDD); (Rlease 7)"; 3GPP Draft; TSG-RAN WG3 Meeting #57; R3-071765 (HSPA EVO TR2.2.0); Athens, Greece; Aug. 31, 2007; 64 pages.

Prasad, R. et al.; "An Overview of CDMA Evolution Toward Wideband CDMA"; IEEE Communications Surveys; vol. 2, No. 1; Jan. 1, 1998; 28 pages.

Samsung; "Uplink Macro-Diversity in Evolved UTRA"; 3GPP TSG RAN WG1 Meeting #42; R1-050880; London, UK; Aug. 25, 2005; 6 pages.

Shen, G. et al.; "Recommendations on IEEE 802.16j"; IEEE; May 8, 2006; 14 pages.

Valenti, Matthew C.; "Improving Uplink Performance by Macrodiversity Combining Packets from Adjacent Access Points"; Wireless Communications and Networking; 2003 IEEE Mar. 16-20, 2003; Piscataway, NJ; pp. 636-641.

Extended European Search Report issued in European Application No. 10156438.3 on Sep. 1, 2010; 10 pages.

Communication Pursuant to Article 94(3) EPC issued in European Application No. 10156438.3 on Jul. 19, 2011; 4 pages.

Communication Pursuant to Article 94(3) EPC issued in European Application No. 10156438.3 on Dec. 12, 2011, 2011; 5 pages.

Office Action issued in U.S. Appl. No. 12/723,396 on May 12, 2011; 8 pages.

Office Action issued in U.S. Appl. No. 12/723,396 on Nov. 1, 2011; 7 pages.

U.S. Appl. No. 61/233,429, entitled "System and Method for Association and Uplink Adaptation in a Relay Network", inventor Hu et al., filed Aug. 12, 2009.

Communication Pursuant to Article 94(3) EPC issued in European Application No. 10156438.3 on Aug. 27, 2012; 5 pages.

Office Action issued in Japanese Application No. 2011-054730 on Aug. 24, 2012; 7 pages.

Notice of Allowance issued in U.S. Appl. No. 12/723,396 on Feb. 16, 2012; 9 pages.

Office Action issued in Chinese Application No. 201110096182.3 on May 27, 2013; 16 pages.

Final Office Action issued in Japanese Application No. 2011-054730 on May 16, 2013; 7 pages.

Communication under Rule 71(3) EPC issued in European Application No. 10156438.3 on Apr. 19, 2013; 7 pages.

Communication under Rule 71(3) EPC issued in European Application No. 10156438.3 on Sep. 26, 2013; 7 pages.

Research in Motion UK Limited; "DL Performance Evaluation of Type-II Relay"; 3GPP TSG RAN WG1 Meeting #59; R1-094461; Jeju, Korea; Nov. 9-13, 2000; 6 pages.

Huawei; "Issues of Type 2 Relay"; 3GPP TSG RAN WG1 Meeting #58; R1-093044; Shenzhen, China; Aug. 24-28, 2009; 8 pages.

Office Action issued in Canadian Application No. 2,733,733 on Jul. 31, 2013; 2 pages.

Extended European Search Report issued in European Application No. 13177304.6 on Aug. 23, 2013; 8 pages.

Notice of Allowance issued in Canadian Application No. 12,733,733 on Apr. 10, 2014; 1 page.

Office Action issued in Chinese Application No. 201110096182.3 on Jan. 23, 2014; 19 pages.

Office Action issued in Chinese Application No. 201110096182.3 on Jul. 31, 2014; 4 pages. No translation.

Communication Pursuant to Article 94(3) EPC issued in European Application No. 13177304.6 on Jun. 16, 2014; 5 pages.

\* cited by examiner

SUPPLEMENTAL NODE TRANSMISSION ASSISTANCE IN A WIRELESS COMMUNICATION NETWORK

CROSS-REFERENCE TO RELATED APPLICATION

This application is a continuation of U.S. patent application Ser. No. 12/723,396 filed Mar. 12, 2010 which is incorporated herein by reference.

TECHNICAL FIELD

The present disclosure relates generally to a wireless communications network, and, more specifically, to the use of supplemental wireless communication network nodes to improve uplink and downlink wireless transmissions between the network and wireless user equipment.

BACKGROUND

A mobile or cellular telephone system is an example of a wireless communications system for transmitting and receiving data between wireless end user equipment or applications and wireless network equipment. Transmitted and received data may be in the form of data packets. Transmitted and received data packets may be in a variety of formats and may include a variety of different types of data, such as voice data, binary data, video data, and the like.

In a typical wireless communications system, wireless transmissions take place between wireless user equipment, such as a cellular telephone or other device using wireless technology, and nodes of the wireless communications network. Transmissions from the network nodes to the user equipment are referred to as downlink transmissions or forward link transmissions. Transmissions from the user equipment to the network nodes are known as uplink transmissions or reverse link transmissions.

Some known or proposed wireless communications networks may provide different types of network nodes for providing wireless communications with wireless user equipment. For example, a heterogeneous Long Term Evolution Advanced, LTE-A, wireless communications network employs both regular nodes, such as conventional evolved Universal Mobile Telecommunications System, UMTS, Terrestrial Radio Access Network, E-UTRAN, Node B nodes, and relay nodes for communications with wireless user equipment. In this case, the regular nodes and relay nodes perform similar functions in establishing and carrying out wireless communications with user equipment. The main difference between the regular nodes and relay nodes is the transmission power. For example, in a Long Term Evolution Advanced, LTE-A, network, there likely will be a large difference between E-UTRAN Node B transmission power, for example, 46 dBm, and relay node transmission power, for example, 30 dBm or 36 dBm.

At the initiation of wireless communications between wireless user equipment and a wireless communications network, or as the user equipment moves, the user equipment selects the network node with which it will communicate. This node is known as the serving node. The serving node is used for both uplink and downlink communications between the user equipment and the network. Typically, the user equipment will attempt to select the best network node to operate as the serving node based on downlink signal strength. Thus, user equipment typically will select the network node from which the user equipment receives the strongest downlink signal as the serving node. In a wireless communications network that provides both standard and relay nodes, either a standard node, such as a conventional E-UTRAN node B node, or a relay node may be selected by the user equipment as the serving node based on received downlink signal strength at the user equipment.

BRIEF DESCRIPTION OF THE DRAWINGS

For a better understanding of the various embodiments described herein, and to show more clearly how they may be carried into effect, reference will now be made, by way of example only, to the accompanying drawings which show at least one exemplary embodiment and in which.

DETAILED DESCRIPTION

Figure 1:
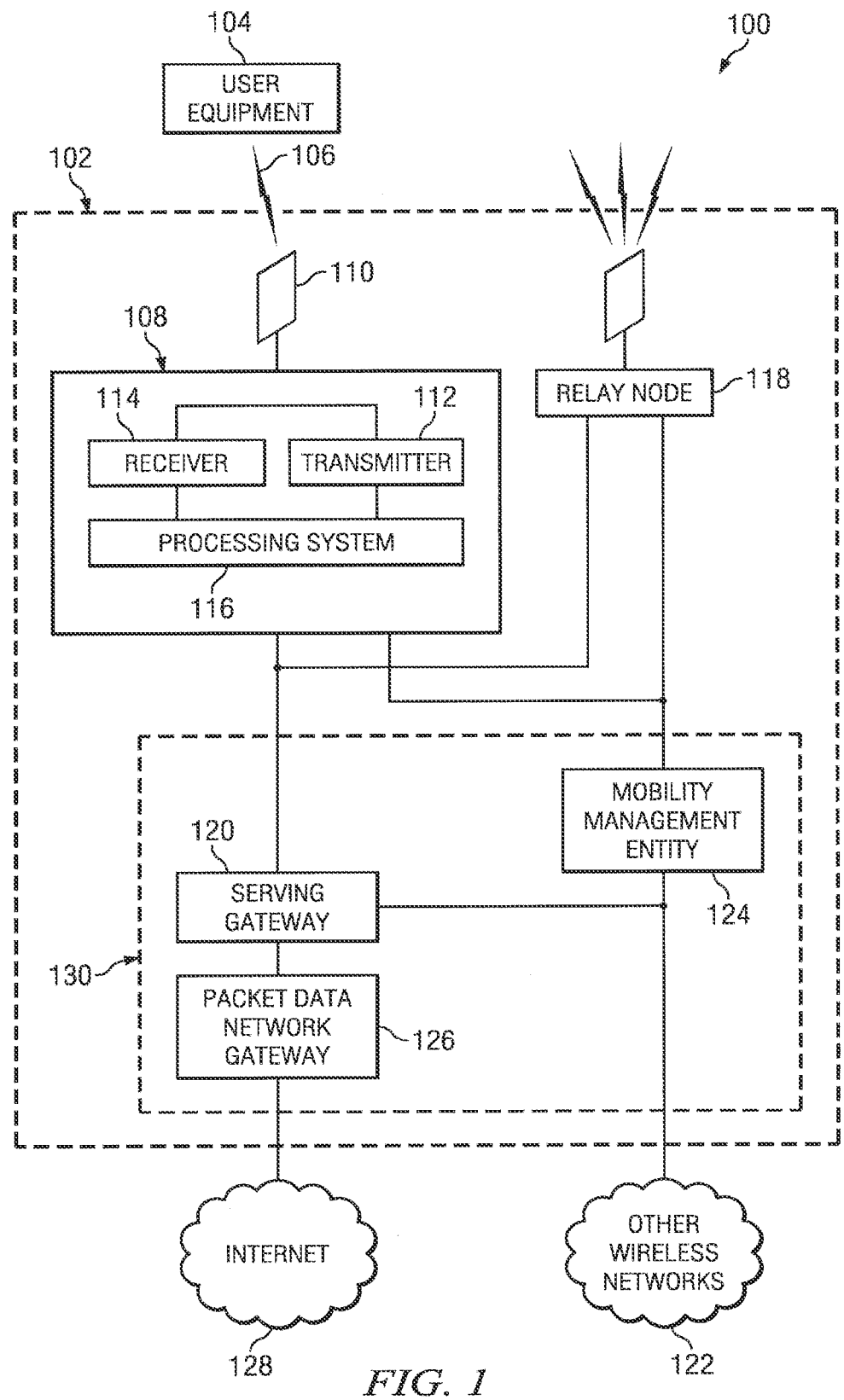
FIG. 1 is a block diagram of a wireless network in accordance with an illustrative embodiment.

It will be appreciated that, for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The different embodiments disclosed herein recognize and take into account a number of different considerations. For example, the disclosed embodiments recognize and take into account that a wireless network may include different types of network nodes, such as standard nodes and relay nodes, for wireless communications with wireless user equipment. Such different types of network nodes may provide for different levels of transmission power on the downlink from the nodes to the user equipment. On the uplink, however, there is only one uplink transmission from the user equipment. The uplink from the user equipment may be received by multiple standard and relay nodes in a wireless communications network. The received power from such an uplink transmission is heavily dependent on the propagation path between the user equipment and the receiving standard or relay node. Therefore, there are times when user equipment will receive a stronger downlink transmission from a standard node, having greater transmission power, while, at the same time, another node, such as a relay node, receives a stronger uplink transmission signal from the user equipment. This leads to an uplink/downlink reception imbalance.

The disclosed embodiments also recognize and take into account that an uplink/downlink reception imbalance may make it difficult for user equipment to select the best node, either a standard node or a relay node, as the serving node for its uplink and downlink communications needs. For example, in a Long Term Evolution Advanced network employing E-UTRAN Node B nodes and Type 1 relay nodes that function as lower power E-UTRAN Node B nodes, it may be difficult for legacy user equipment to select the best E-UTRAN Node B node or Type 1 relay node for its serving node. User equipment normally chooses its serving node based on downlink signal strength. On the other hand, it is important for the user equipment to have both good downlink and uplink signal power. Otherwise, bi-directional communication with the user equipment cannot be guaranteed, especially for voice service.

The embodiments disclosed herein provide a method and system that employs multiple network nodes for wireless communications between a communications network and wireless user equipment that enables the user equipment to have both the best available downlink and uplink signal power. In particular, the disclosed embodiments employ supplemental nodes, such as an uplink supplemental node or a downlink supplemental node, for providing transmission assistance to a serving node in providing wireless transmissions between a wireless communications network and wireless user equipment. The disclosed embodiments may be implemented in any wireless communications network in which an uplink/downlink reception imbalance may occur. In particular, the disclosed embodiments may be implemented in a heterogeneous wireless communications network having both higher power network nodes and lower power relay nodes for communications with wireless user equipment. For example, illustrative embodiments may be implemented in a heterogeneous Long Term Evolution Advanced wireless network employing relay nodes, such as Type 1, Type 2 or other relay nodes, to fully exploit the gain available by utilizing the available relay nodes.

A wireless communications system in accordance with an illustrative embodiment is depicted in FIG. 1. Wireless communications system 100 includes wireless communications network 102. For example, wireless network 102 may be a wireless network implemented in accordance with the Long Term Evolution, LTE, standard for mobile network technology. It should be understood, however, that illustrative embodiments may be implemented in other wireless communications networks, such as a Universal Mobile Telecommunications System, UMTS, network, a Global Systems for Mobile, GSM, network, or any other current or future wireless network employing any other standard or technology. Wireless network 102 may comprise a single network or multiple networks forming a network of networks.

Wireless network 102 provides wireless communications with user equipment 104 via wireless communications channel 106. As will be discussed in more detail below, examples of user equipment 104 may include mobile wireless communication devices including pagers, cellular phones, cellular smart-phones, wireless organizers, personal digital assistants, computers, laptops, handheld wireless communication devices, wirelessly enabled notebook computers and the like. Although only user equipment 104 is shown by example in FIG. 1, wireless network 102 may support simultaneous communications with large numbers of user equipment of various different types.

Wireless communications channel 106 is established dynamically between user equipment 104 and node 108 of wireless network 102. Channel 106 may be established, for example, at the time that a call to or from user equipment 104 is initiated. For a Long Term Evolution network, the air interface between user equipment 104 and node 108 is the Evolved Universal Mobile Telecommunications System Terrestrial Radio Access Network, E-UTRAN.

E-UTRAN uses orthogonal frequency-division multiplexing, OFDMA, a system where the available spectrum is divided into many thin carriers, each on a different frequency, each carrying a part of the signal. For downlink transmissions, from node 108 to user equipment 104, there are at least four main physical channels. The physical downlink control channel, PDCCH, is used for transmitting the downlink control information. The physical downlink shared channel, PDSCH, is used for all data transmission. The physical multicast channel, PMCH, is used for broadcast transmissions using a single frequency network. The physical broadcast channel, PBCH, is used to send most important system information within a cell.

In the uplink, from user equipment 104 to node 108, there are at least three physical channels. All data is sent on the physical uplink shared channel, PUSCH. For the physical uplink shared channel only, E-UTRAN uses a pre-coded version of orthogonal frequency-division multiplexing called single carrier frequency division multiple access, SC-FDMA, which reduces power consumption and peak-to-average-power ratio, PARR, in user equipment 104. The physical random access channel, PRACH, is used for initial access and when user equipment 104 is not uplink synchronized. Uplink control information typically is transmitted on the physical uplink control channel, PUCCH.

E-UTRAN provides for hybrid automatic repeat request, HARQ, retransmissions between user equipment 104 and node 108, for reliability. Hybrid automatic repeat request retransmissions include asynchronous adaptive re-transmissions in the downlink, from node 108 to user equipment 104, and synchronous non-adaptive retransmissions in the uplink, from user equipment 104 to node 108. Synchronous non-adaptive hybrid automatic repeat request retransmission means that the retransmission of hybrid automatic repeat request blocks occurs at pre-defined periodic intervals and that the modulation and code scheme of the retransmission is the same as the initial transmission. Therefore, no explicit signaling is required to indicate the retransmission schedule to the receiver. Asynchronous adaptive hybrid automatic repeat request transmission offers the flexibility of scheduling re-transmissions based on air interface conditions.

Node 108 is a radio access node providing the interface between wireless network 102 and user equipment 104. Node 108 may be referred to generically as a base transceiver station. Node 108 includes one or more radio frequency transmitters 112 and receivers 114 coupled to one or more antennas 110. E-UTRAN employs multiple-input and multiple-output, MIMO, technology. Therefore, node 108 in a Long Term Evolution network may employ multiple antennas 110 for communication with user equipment 104 over wireless channel 106, such as up to four or more antennas 110 per node 108. Antenna 110 may include smart antenna arrays with signal processing algorithms used to identify spatial signal signatures, such as the direction of arrival of a signal, and to use such signatures to calculate beamforming vectors, to track and locate the antenna beam on mobile user equipment 104.

Transmitters 112 and receivers 114 are used by node 108 to communicate directly with mobile devices, such as user equipment 104, via wireless communication channel 106. Node 108 provides wireless network coverage for a particular coverage area, commonly referred to as a "cell". Node 108 includes one or more processing systems 116, such as computer processing systems, for implementing the functionality provided by node 108. In a Long Term Evolution network, node 108 is an Evolved Universal Terrestrial Radio Access Network Node B, E-UTRAN Node B, or eNB. Such a node performs many functions, including radio resource management, admission control, scheduling, enforcement of negotiated uplink quality of service, cell information broadcast, ciphering and deciphering of user and control data, and compression and decompression of downlink and uplink user packet headers. Such functionality may be implemented in software programs executed by processing system 116. Node 108 also may be adapted to perform functions related to providing supplemental node transmission assistance in accordance with an illustrative embodiment, as will be described in more detail below.

Although only node 108 is shown in FIG. 1, wireless network 102 in accordance with an illustrative embodiment may include many similar nodes. Wireless network 102 may include different types of nodes for providing the interface between wireless network 102 and user equipment 104. For example, in a heterogeneous Long Term Evolution-Advanced network, both standard nodes 108, such as E-UTRAN Node B nodes, and relay nodes 118, or other types of low transmission power nodes, are provided. Relay nodes 118, such as Type 1 relay nodes, Type 1a relay nodes, Type 1b relay nodes, Type 2 relay nodes, or other types of relay nodes in a Long Term Evolution-Advanced network, may provide the same basic functionality as standard nodes 108. However, relay nodes 118 provide less transmission power than standard nodes 108. Although only relay node 118 is shown in FIG. 1, wireless network 102 in accordance with an illustrative embodiment may include many relay nodes.

Serving gateway 120 routes and forwards user data packets to and from nodes 108 and 118. Serving gateway 120 also acts as a mobility anchor during inter-node handovers, which occur when user equipment 104 moves out of the coverage area of one node 108 and into the coverage area of another node. Similarly, serving gateway 120 acts as the anchor for mobility between Long Term Evolution network 102 and other wireless networks 122 using other standards and technologies.

Mobility management entity 124 is responsible for tracking and paging procedures, including retransmissions, when user equipment 104 is in idle mode, that is, when user equipment 104 is not actively transmitting and receiving data via node 108 or 118. It is involved in the activation and deactivation process, and is also responsible for choosing the serving gateway at the initial attachment of user equipment 104 to network 102 and at the time of a handover involving node reallocation. It is responsible for authenticating users. Mobility management entity 124 also provides the control functions for mobility between Long Term Evolution network 102 and other wireless networks 122 using other standards and technologies.

Packet data network gateway 126 provides connectivity to external packet data networks, such as the Internet 128. Thus, packet data network gateway 126 provides connectivity for user equipment 104 to external packet data networks by being the point of exit and entry of packet data network traffic for user equipment 104. User equipment 104 may have simultaneous connectivity with more than one packet data network gateway for accessing more than one packet data network.

Serving gateway 120, mobility management entity 124, and packet data network gateway 126 form core network 130 of Long Term Evolution wireless network 102. Although only serving gateway 120, mobility management entity 124, and packet data network gateway 126 are shown in the example illustrated in FIG. 1, core network 130 of a Long Term Evolution wireless network in accordance with an illustrative embodiment may include multiple serving gateways, mobility management entities, and packet data network gateways. A Long Term Evolution wireless network provides for network support and load sharing of traffic across network elements in the core network 130 by creating pools of mobility management entities and serving gateways and allowing each node 108 or 118 in the network to be connected to multiple mobility management entities and serving gateways in a pool. The various nodes 108 and 118 of wireless network 102 may communicate with each other via a backhaul communication channel extending through core network 130.

It can be seen that a main function of core network 130 is to provide for the routing of data packets among user equipment 104 on network 102 and between user equipment 104 on network 102 and users on other networks, such as other wireless networks 122 and other public or private networks, such as the Internet 128, the Public Switched Telephone Network, and the like. Functions provided by core network 130 in Long Term Evolution network 102, as illustrated in FIG. 1, may be provided by different system and structures in different types of wireless networks in which illustrative embodiments may be implemented, including, for example, in Global System for Mobile Communications, GSM, and Universal Mobile Telecommunications System, UMTS, networks. The list of components presented with respect to FIG. 1 is not meant to be an exhaustive list of the components of a wireless network, but rather a list of components that are commonly used in communications through wireless network 102.

Figure 2:
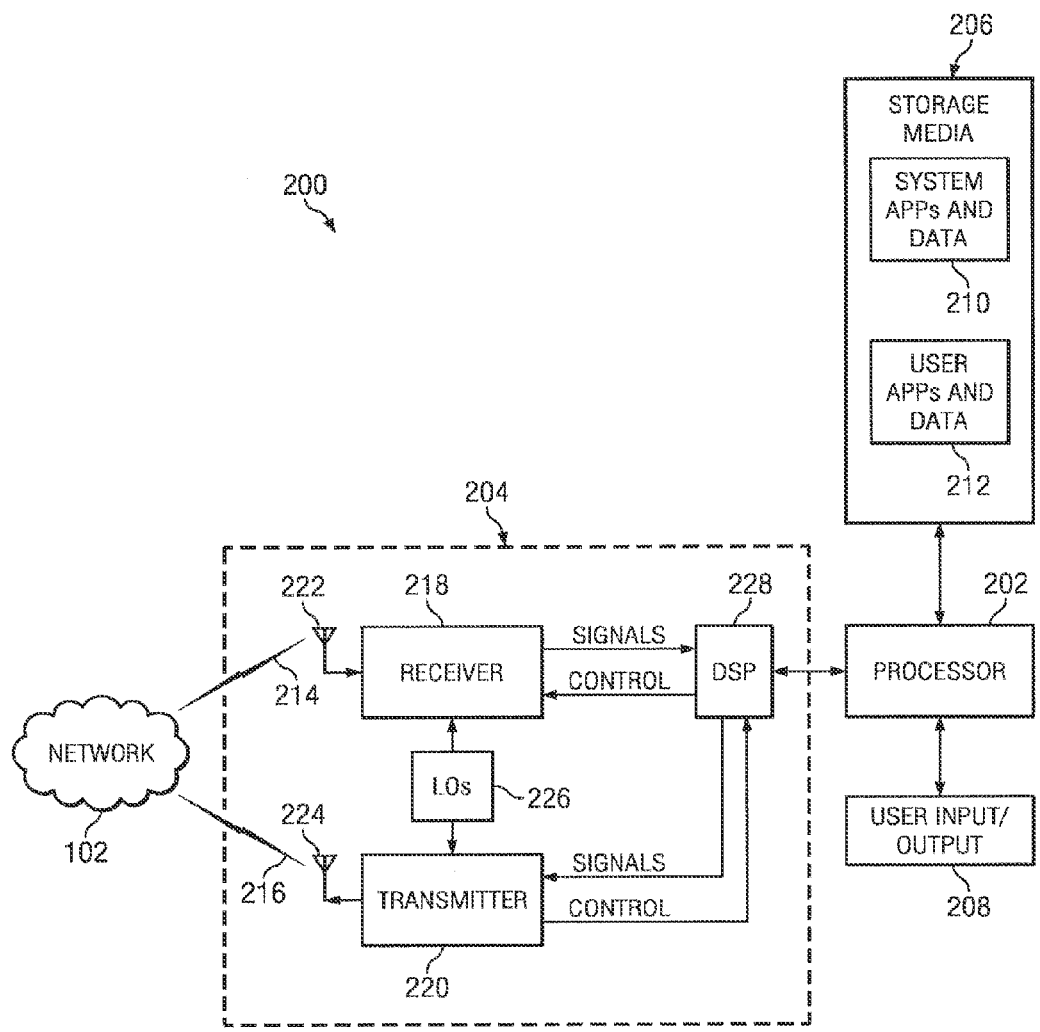
FIG. 2 is a block diagram of wireless user equipment in accordance with an illustrative embodiment.

FIG. 2 is a block diagram of wireless user equipment in accordance with an illustrative embodiment. In this example, user equipment 200 is an example of user equipment 104 in FIG. 1. User equipment 200 may include any two-way communication device with data communication capabilities, including the capability to communicate with other user equipment, computer systems, or other devices through a wireless communications network, such as, for example, communications network 102 described above with reference to FIG. 1. User equipment 200 may, but need not, have the capability to provide voice communications. Depending on the functionality provided, user equipment 200 may be referred to as a data messaging device, a two-way pager, a cellular telephone with data messaging capabilities, a wireless Internet appliance, or a data communications device, with or without telephony capabilities.

User equipment 200 includes processor 202. Processor 202 controls the overall operation of user equipment 200. Processor 202 may be implemented as one or more individual programmable processing devices, including one or more microprocessors or similar devices adapted for running computer programs.

Processor 202 interacts with user equipment subsystems, such as communications subsystem 204, storage media 206, and user input and output subsystem 208. Communications subsystem 204 will be described in more detail below. Storage media 206 may include various types of memory media or memory devices readable by processor 202, such as random access memory, read-only memory, flash memory, a subscriber identity module, SIM, or a removable user identity module, RUIM, card, or any other type of media, device, or structure for storing computer programs and data in any form usable by processor 202. User input and output subsystem 208 includes devices or structures for providing direct user interaction with user equipment 200. For example, user input and output subsystem 208 may include a display, keyboard or key pad, speaker, microphone, or any other device or structure providing for direct interaction of a user with user equipment 200, such as a touch screen, mouse, track ball, infrared fingerprint detector, or a roller wheel with dynamic button pressing capability. User equipment 200 may include subsystems other than those illustrated in FIG. 2 and described in detail herein, such as a data port, a short-range wireless communications device, and a battery interface to one or more rechargeable batteries, and other device subsystems. All user equipment subsystems may be in direct or indirect communication with processor 202, such that processor 202 may interact with or control operation of the subsystems, as appropriate.

Storage media 206 includes stored therein computer programs in the form of software components that are run by processor 202 and associated data used in running the programs or resulting from execution of the programs. Computer programs and related data stored in storage media 206 include computer programs implementing system applications and related system application data 210 and computer programs implementing user applications and related user application data 212.

System applications 210 include applications implementing functions related to general operation of user equipment 200. System applications 210 typically operate automatically in a manner that is invisible to a user of user equipment 200. For example, system applications 210 may include an operating system application, a connect function for implementing the communication protocols that are required for user equipment 200 to communicate with the wireless infrastructure and any host system that user equipment 200 is authorized to interface with, a device state application providing persistence for ensuring that important device data is stored in persistent memory so that the data is not lost when user equipment 200 is turned off or loses power, a battery power management and charging function, or any other functions necessary or desirable for operation of user equipment 200.

User applications 212 include applications implementing functions that are used by a user of user equipment 204 via user interaction with user input and output subsystem 208. User applications 212 may include messaging functions that allow a user to create, send, receive, view, and save various types of messages. Other user applications 212 may include a personal information manager application including functionality for organizing and managing data items of interest to the user, such as, but not limited to, e-mail, contacts, calendar events, voice mails, appointments, and task items. A personal information manager application may have the ability to send and receive data items via wireless network 102. Personal information data items may be seamlessly integrated, synchronized, and updated via wireless network 102 with the user equipment subscriber's corresponding data items stored or associated with a host computer system. This functionality creates a mirrored host computer on user equipment 200 with respect to such items. This can be particularly advantageous when the host computer system is the user equipment subscriber's office computer system.

Other types of programs or software applications also may be installed in storage media 206 on user equipment 200. Such software applications may include third party applications, which are added after the manufacture of user equipment 200. Examples of third party applications include user applications 212 such as games, calculators, utilities, etc. Additional system applications 210 or user applications 212 may be loaded onto user equipment 200 via wireless network 102, an auxiliary I/O subsystem, a data port, a short-range wireless communications subsystem, or any other suitable device subsystem provided on user equipment 200.

Communication functions, including data and voice communications, are performed by communications subsystem 204. Communications subsystem 204 receives messages from and sends messages to wireless network 102. For example, communications subsystem 204 may be configured to send and receive messages in the form of data packets in accordance with the Long Term Evolution, LTE, technology standard using Evolved Universal Mobile Telecommunications System Terrestrial Radio Access Network, E-UTRAN, technology. Alternatively, or additionally, communication subsystem 204 may be configured to use Universal Mobile Telecommunications System Terrestrial Radio Access Network, UTRAN, technology, or in accordance with the Global System for Mobile Communication, GSM, and General Packet Radio Services, GPRS, standards. Other wireless networks also may be associated with user equipment 200 in variant implementations. The different types of wireless networks that may be employed include, for example, data-centric wireless networks, voice-centric wireless networks, and dual-mode networks that can support both voice and data communications over the same physical base stations, such as those described by example above. New standards are still being defined, but it is believed that wireless networks implemented in accordance with new standards will have similarities to the networks described herein. It will also be understood by persons skilled in the art that the embodiments described herein are intended to use any other suitable standards that are developed in the future.

Wireless links 214 and 216 connecting communications subsystem 204 with wireless network 102 represent one or more different radio frequency, RF, channels, operating according to defined protocols specified for the particular communication technologies being employed. With certain network protocols, channels 214 and 216 are capable of supporting both circuit switched voice communications and packet switched data communications.

Communications subsystem 204 includes receiver 218 and transmitter 220, as well as associated components, such as one or more embedded or internal antenna elements 222 and 224, local oscillators, LOs, 226, and a processing module, such as a digital signal processor, DSP, 228. The particular design of communications subsystem 204 is dependent upon the network with which user equipment 200 is intended to operate. Thus, communications subsystem 204 illustrated in FIG. 2 provides only an example of a communications subsystem for user equipment in accordance with an illustrative embodiment.

Downlink signals received by antenna 222 from wireless network 102 on wireless downlink channel 214 are input to receiver 218. Receiver 218 may be adapted to perform such common receiver functions as signal amplification, frequency down conversion, filtering, channel selection, and analog-to-digital conversion. Analog-to-digital conversion of a received signal allows more complex communication functions, such as demodulation and decoding, to be performed in digital signal processor 228. In a similar manner, uplink signals to be transmitted are processed, including modulation and encoding, by digital signal processor 228. The processed uplink signals from digital signal processor 228 are input to transmitter 220. Transmitter 220 may be adapted to perform such common transmitter functions as digital-to-analog conversion, frequency up conversion, filtering, amplification and transmission to wireless network 102 over wireless uplink channel 216 via antenna 224. Digital signal processor 228 not only processes communication signals, but also provides for receiver and transmitter control. For example, gains applied to communication signals in receiver 218 and transmitter 220 may be adaptively controlled through automatic gain control algorithms implemented in digital signal processor 228.

The wireless link between user equipment 200 and wireless network 102 may contain one or more different channels, typically different radio frequency channels, and associated protocols used between user equipment 200 and wireless network 102. A radio frequency channel is a limited resource that must be conserved, typically due to limits in overall bandwidth and limited battery power of user equipment 200. When user equipment 200 is fully operational, transmitter 220 typically is keyed or turned on only when it is transmitting to wireless network 102 and is otherwise turned off to conserve resources. Similarly, receiver 218 is periodically turned off during designated time periods to conserve power until it is needed to receive signals or information.

In use, a received signal, such as a text message, an e-mail message, or web page download, is processed by communications subsystem 204 and provided to processor 202. Processor 202 will then process the received signal for output to a user output device 208, such as a display. A user may also compose data items, such as e-mail messages, for example, using user input and output devices 208, such as a keyboard in conjunction with a display. A composed item may be transmitted to wireless network 102 through communications subsystem 204.

For voice communications, the overall operation of user equipment 200 is substantially similar, except that the received signals are output to a speaker and signals for transmission are generated by a microphone. Alternative voice or audio input and output subsystems, such as a voice message recording subsystem, can also be implemented on user equipment 200. Although voice or audio signal output is accomplished primarily through a speaker, a display can also be used to provide additional information, such as the identity of a calling party, duration of a voice call, or other voice call related information.

One or more different illustrative embodiments may be applied to types of communications and standards other than those described above with respect to FIGS. 1 and 2. For example, without limitation, the different illustrative embodiments may be implemented using LTE Advanced. Additionally, the wireless networks illustrated may take the form of or include 4G networks.

Figure 3:
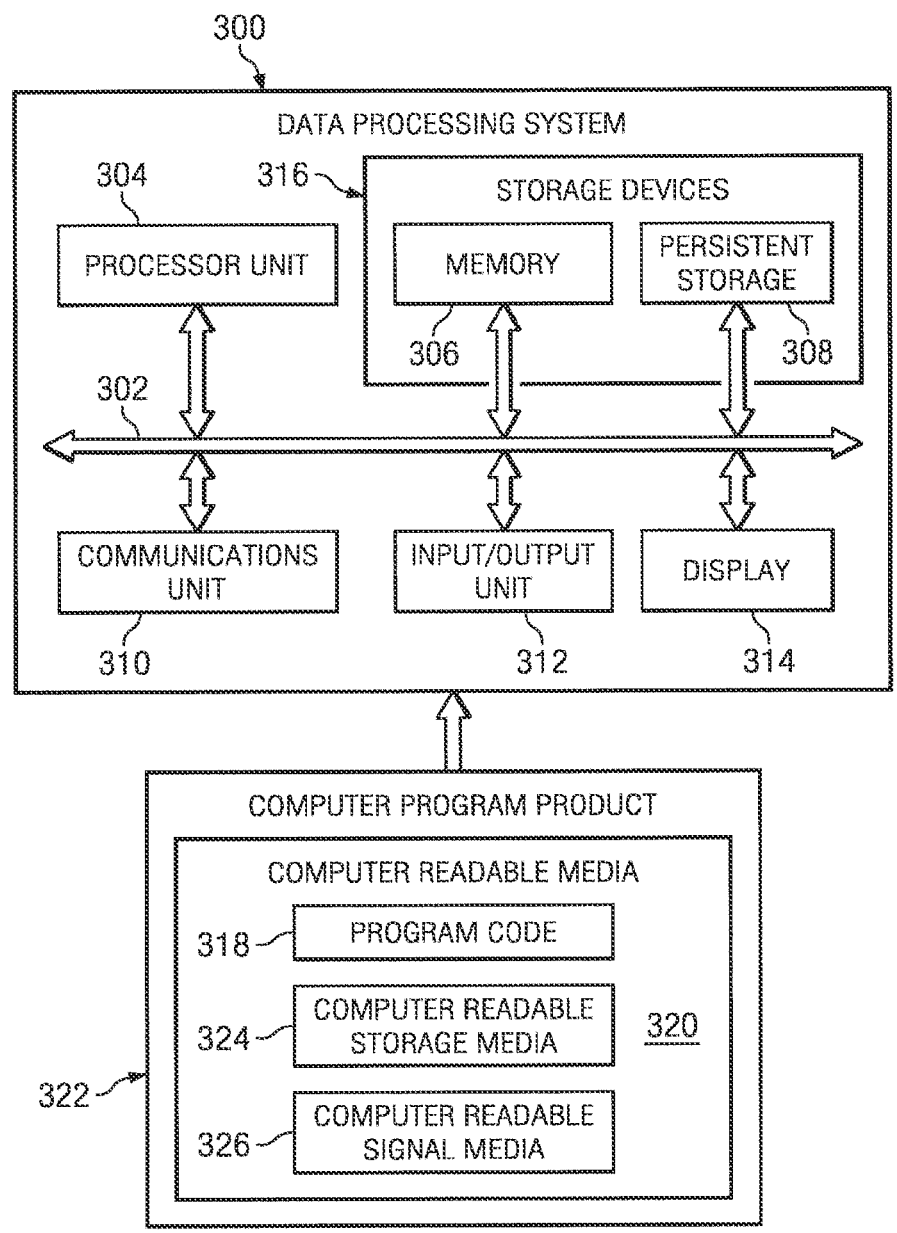
FIG. 3 is a block diagram of a data processing system depicted in accordance with an illustrative embodiment.

FIG. 3 is block diagram of a data processing system 300 depicted in accordance with an illustrative embodiment. In this example, data processing system 300 is an example of one implementation of processing system 116 in node 108 in FIG. 2. Data processing system 300, or portions thereof, also may be used to implement one or more functions of user equipment 200 as illustrated in FIG. 2. In this illustrative example, data processing system 300 includes communications fabric 302, which provides communications between processor unit 304, memory 306, persistent storage 308, communications unit 310, input/output unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems, in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory, or any other suitable volatile or non-volatile storage device. Persistent storage 308 may take various forms, depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 may be removable. For example, a removable hard drive may be used for persistent storage 308.

Communications unit 310, in these examples, provides for communication with other data processing systems or devices. In these examples, communications unit 310 is a network interface card. Communications unit 310 may provide communications through the use of either or both physical and wireless communications links.

Input/output unit 312 allows for the input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 in order to be run by processor unit 304. The processes of the different embodiments may be performed by processor unit 304 using computer implemented instructions, which may be located in a memory, such as memory 306.

These instructions are referred to as program code, computer usable program code, or computer readable program code that may be read and run by a processor in processor unit 304. The program code, in the different embodiments, may be embodied on different physical or computer readable storage media, such as memory 306, or persistent storage 308.

Program code 318 is located in a functional form on computer readable media 320 that is selectively removable and may be loaded onto or transferred to data processing system 300 to be run by processor unit 304. Program code 318 and computer readable media 320 form computer program product 322. In one example, computer readable media 320 may be computer readable storage media 324 or computer readable signal media 326. Computer readable storage media 324 may include, for example, an optical or magnetic disc that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 318 may be downloaded over a network to persistent storage 308 from another device or data processing system through computer readable signal media 326 for use within data processing system 300. For instance, program code stored in a computer readable storage media in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. The different embodiments may be implemented using any hardware device or system capable of executing program code. As one example, data processing system 300 may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

The illustration of components in FIGS. 1-3 is not meant to imply physical or architectural limitations to the manner in which different illustrative embodiments may be implemented. Other components in addition to or in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Figure 4:
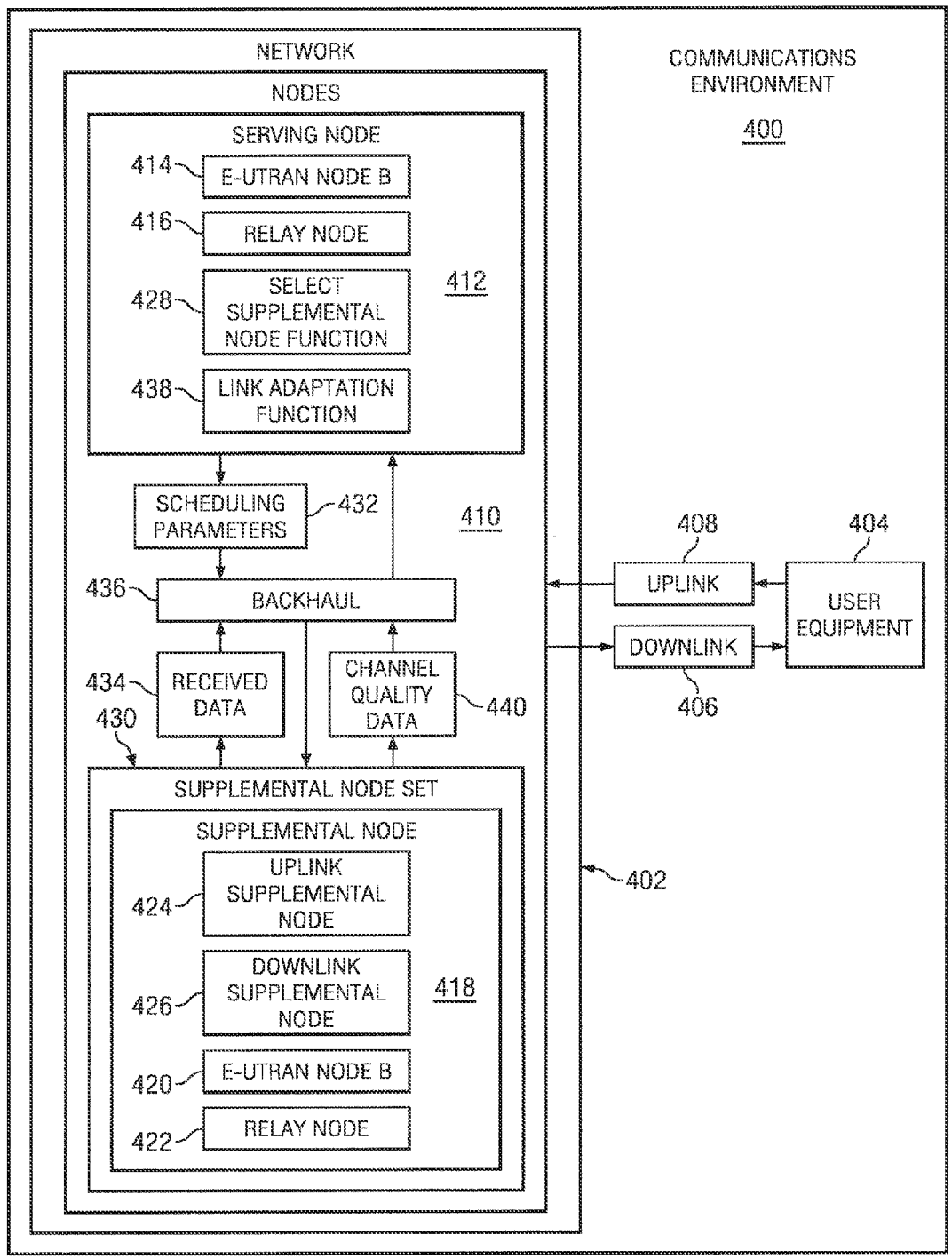
FIG. 4 is a block diagram illustrating a communications environment in accordance with an illustrative embodiment.

FIG. 4 is a block diagram illustrating a communications environment depicted in accordance with an illustrative embodiment. Communications environment 400 provides supplemental node transmission assistance in accordance with an illustrative embodiment. Communications environment 400 includes network 402 and associated user equipment 404. Wireless network 102 in FIG. 1 is an example of one implementation of network 402 in FIG. 4. User equipment 104 in FIG. 1 and user equipment 200 in FIG. 2 are examples of user equipment 404 in FIG. 4. As discussed above, user equipment 404 may include a variety of devices, such as mobile wireless communications devices including pagers, cellular phones, cellular smart-phones, wireless organizers, personal digital assistants, computers, laptops, handheld wireless communication devices, wireless enabled notebook computers and the like.

In operation, user equipment 404 is in communication with network 402 via wireless communication channels in the manner described above. Communications between network 402 and user equipment 404 in the direction from network 402 to user equipment 404 are downlink communications and include downlink transmissions over downlink channel 406. Communications between network 402 and user equipment 404 in the direction from user equipment 404 to network 402 are uplink communications and include uplink transmissions over uplink channel 408. Thus, network 402 and user equipment 404 exchange data packets via wireless downlink channel 406 and wireless uplink channel 408.

Network 402 includes a plurality of network nodes 410. Wireless network nodes 108 and 118 of FIG. 1 are examples of nodes 410 of FIG. 4. User equipment 404 communicates with network 402 via network nodes 410.

In accordance with an illustrative embodiment, one of network nodes 410 operates as serving node 412 for user equipment 404. The functionality of serving node 412, to be described in more detail herein, may be implemented in a standard network node, such as E-UTRAN Node B node 414, or in network relay node 416, such as a Type 1 relay node, or in other low transmission power nodes. Serving node 412 may be selected as the one of network nodes 410 having the strongest detected signal strength or lowest coupling loss in one transmission direction with user equipment 404. For example, user equipment 404 may select serving node 412 as the one of network nodes 410 providing the strongest received downlink signal at user equipment 404.

In accordance with an illustrative embodiment, serving node 414 is used for transmissions in a first direction, i.e., on downlink 406 or uplink 408, between network 402 and user equipment 404. At the same time, another one of network nodes 410 operates as supplemental node 418 for user equipment 404. The functionality of supplemental node 418, to be described in more detail herein, may be implemented in a standard network node, such as E-UTRAN Node B node 420, or in network relay node 422, such as a Type 1 relay node, or in other low power transmission nodes. Supplemental node 418 is used for transmissions in a second direction, i.e., on uplink 408 or downlink 406, between network 402 and user equipment 404. Thus, in accordance with an illustrative embodiment, supplemental node 418 provides transmission assistance to serving node 412.

In accordance with an illustrative embodiment, supplemental node 418 may provide transmission assistance on uplink 408 or downlink 406. Uplink supplemental node 424 provides transmission assistance on uplink 408. When uplink supplemental node 424 is in use, uplink supplemental node 424 is used for transmissions from user equipment 404 to network 402 on uplink 408 and serving node 412 is used for transmissions from network 402 to user equipment 404 on downlink 406. In this case, serving node 412 may or may not also operate as a receiver of transmissions from user equipment 404 on uplink 408. Downlink supplemental node 426 provides transmission assistance on downlink 406. When downlink supplemental node 426 is in use, downlink supplemental node 426 is used for transmissions from network 402 to user equipment 404 on downlink 406 and serving node 412 is used for transmissions from user equipment 404 to network 402 on uplink 408. In this case, serving node 412 may or may not also operate as a transmitter to user equipment 404 on downlink 406.

In accordance with an illustrative embodiment, serving node 412 includes select supplemental node function 428, whereby serving node 412 selects supplemental node 418 for transmission assistance in order to provide the best available downlink transmissions on downlink channel 406 and uplink transmissions on uplink channel 408 between network 402 and user equipment 404. As will be described in more detail below, when serving node 412 is used for transmissions between network 402 and user equipment 404 in a first direction, select supplemental node function 428 is used to select another one or more other of nodes 410 having better channel conditions for transmissions between network 402 and user equipment 404 than serving node 412 in a second direction to operate as supplemental node 418. For example, where serving node 412 is used for downlink transmissions on downlink 406, select supplemental node function 428 may select one or more other of nodes 410 having a stronger channel signal with user equipment 404 on uplink 408 than serving node 412 to operate as uplink supplemental node 424. Where more than one of nodes 410 satisfies the conditions of select supplemental node function 428 for being selected to operate as supplemental node 418, more than one of nodes 410 may be selected to operate as supplemental node 418. The one or more of nodes 410 selected by select supplemental node function 428 to operate as supplemental nodes form supplemental node set 430.

In accordance with an illustrative embodiment, although supplemental node 418 provides transmission assistance for serving node 412, serving node 412 is still the main interface between network 402 and user equipment 404 and is responsible for controlling communications between network 402 and user equipment 404. Thus, as will be described in more detail below, serving node 412 generates various scheduling parameters 432 that are used for controlling communications between network 402 and user equipment 404 and provides scheduling parameters 432 to the one or more supplemental nodes in supplemental node set 430. When supplemental node 418 is operating as uplink supplemental node 424, received data 434 received from user equipment 404 in uplink transmissions on uplink channel 408 is provided to serving node 410 for distribution on network 402. Communication of scheduling parameters 432 and received data 434, as well as other communications between serving node 412 and supplemental node 418, may be provided over the network backhaul 436.

Link adaptation refers to the matching of the modulation and coding scheme used in a wireless connection to the conditions on the radio link. The process of link adaptation is a dynamic one, and modulation and coding scheme parameters may change as the radio link conditions change. In accordance with an illustrative embodiment, serving node 412 may include link adaptation function 438 for providing link adaptation on the channel, uplink channel 408 or downlink channel 406, for which supplemental node 418 is providing transmission assistance. Link adaptation function 438 may employ channel quality data 440 for the relevant channel that is provided by supplemental node 418 to serving node 412 over backhaul 436 in order to adapt the modulation and coding scheme, power, or other parameters of transmission on the channel to match changing channel conditions. Alternatively, link adaptation function 438 may determine the quality of the channel on which supplemental node 418 is providing transmission assistance indirectly, using retransmission statistics, in a manner as will be described in more detail below.

The illustration of FIG. 4 is not meant to imply physical or architectural limitations to the manner in which different embodiments may be implemented. Other components in addition to or in place of the ones illustrated may be used. Some components may be unnecessary in some embodiments. Also, the blocks are presented to illustrate some functional components. One or more of these blocks may be combined or divided into different blocks when implemented in different advantageous embodiments.

Figure 5:
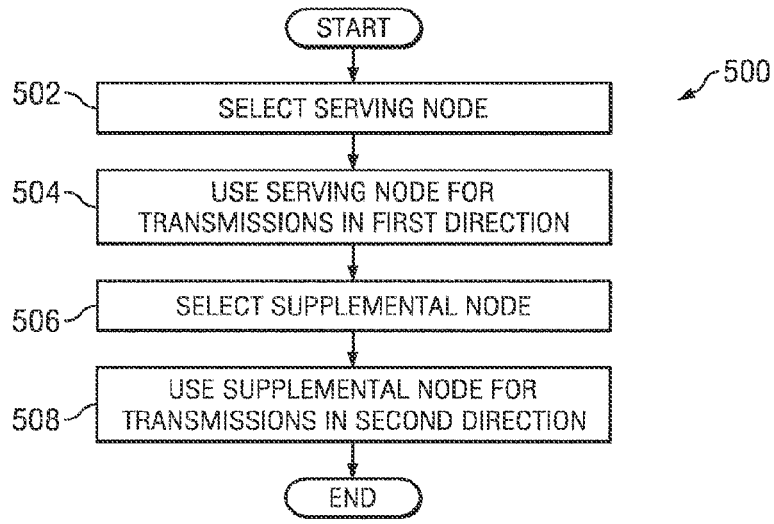
FIG. 5 is a flowchart of a method of supplemental node transmission assistance in a wireless communications network in accordance with an illustrative embodiment.

FIG. 5 is a flowchart illustrating method 500 for providing supplemental node transmission assistance in accordance with an illustrative embodiment. For example, method 500 may be implemented in communications environment 400 of FIG. 4 to provide transmission assistance in wireless communications between a wireless network and wireless user equipment.

A serving node for providing the main interface between the wireless network and wireless user equipment is selected (step 502). The selected serving node is used for transmissions in a first direction, i.e., downlink transmissions or uplink transmissions, between the wireless network and the wireless user equipment (step 504). In another embodiment, the serving node is used for transmissions in both directions. For example, step 502 may include the user equipment selecting a network node with the strongest received signal power on the downlink to be the serving node for the user equipment. The user equipment may select the network node from which the user equipment receives the strongest reference signal receive power, RSRP, to be the serving node. In this case, the serving node is the node whereby the user equipment receives its downlink control signal and step 504 includes using the serving node for downlink transmissions from the serving node to the user equipment. As discussed above, for example, in a Long Term Evolution-Advanced network implementation, the serving node selected in step 502 may be an E-UTRAN Node B node or a relay node. Alternatively, the serving node selected in step 502 may be any network node that provides functions similar to an E-UTRAN Node B node or relay node in any other wireless communications network.

One or more supplemental nodes for providing transmission assistance to the serving node are selected (step 506). The selected supplemental nodes are used for transmissions between the network and the user equipment in a second direction, i.e., for uplink transmissions or downlink transmissions (step 508). Step 506 may include selecting one or more network nodes providing a better wireless channel connection between the network and the user equipment in the second direction than the serving node to operate as a supplemental node. For example, where the serving node is used for downlink transmissions from the network to the user equipment, step 506 may include selecting one or more nodes providing a stronger uplink connection between the user equipment and the network than the serving node to operate as a supplemental node. In this case, the selected supplemental node is an uplink supplemental node and step 508 includes using the uplink supplemental node for uplink transmissions from the user equipment to the network. As discussed above, a supplemental node selected in step 506 may be implemented, for example, in an E-UTRAN Node B node or a relay node in a Long Term Evolution-Advanced network implementation. Alternatively, a supplemental node selected in step 506 may be implemented in any network node that provides functions similar to an E-UTRAN Node B node or relay node in any other wireless communications network.

A detailed example of selecting and using a supplemental node for transmission assistance in accordance with an illustrative embodiment is now presented. In this example, the selection and use of an uplink supplemental node for providing uplink transmission assistance in accordance with an illustrative embodiment is described in detail. It is understood, however, that illustrative embodiments include also downlink transmission assistance provided by a downlink supplemental node. The selection and use of downlink supplemental nodes also will be described in more detail below.

As mentioned above, wireless user equipment may select a serving node based on downlink signal strength, such as reference signal receive power. However, the serving node may receive a weak uplink signal from the user equipment. In accordance with an illustrative embodiment, when the serving node receives a weak uplink signal, the serving node may select an uplink supplemental node to help with the uplink transmission from the user equipment in order to reduce uplink transmission power. Reducing uplink transmission power reduces overall uplink interference.

In accordance with an illustrative embodiment, an uplink supplemental node assists with uplink transmissions, or retransmissions, from wireless user equipment to a wireless network. In this example, the user equipment receives downlink control signals from a serving node. The serving node communicates with the uplink supplemental node over the wireless network backhaul. Communications between the serving node and the uplink supplemental node over the backhaul may include, for example, data received by the uplink supplemental node in an uplink transmission from the user equipment as well as coordination control information. In accordance with an illustrative embodiment, the serving node may or may not be involved in the uplink transmission from the user equipment.

Figure 6:
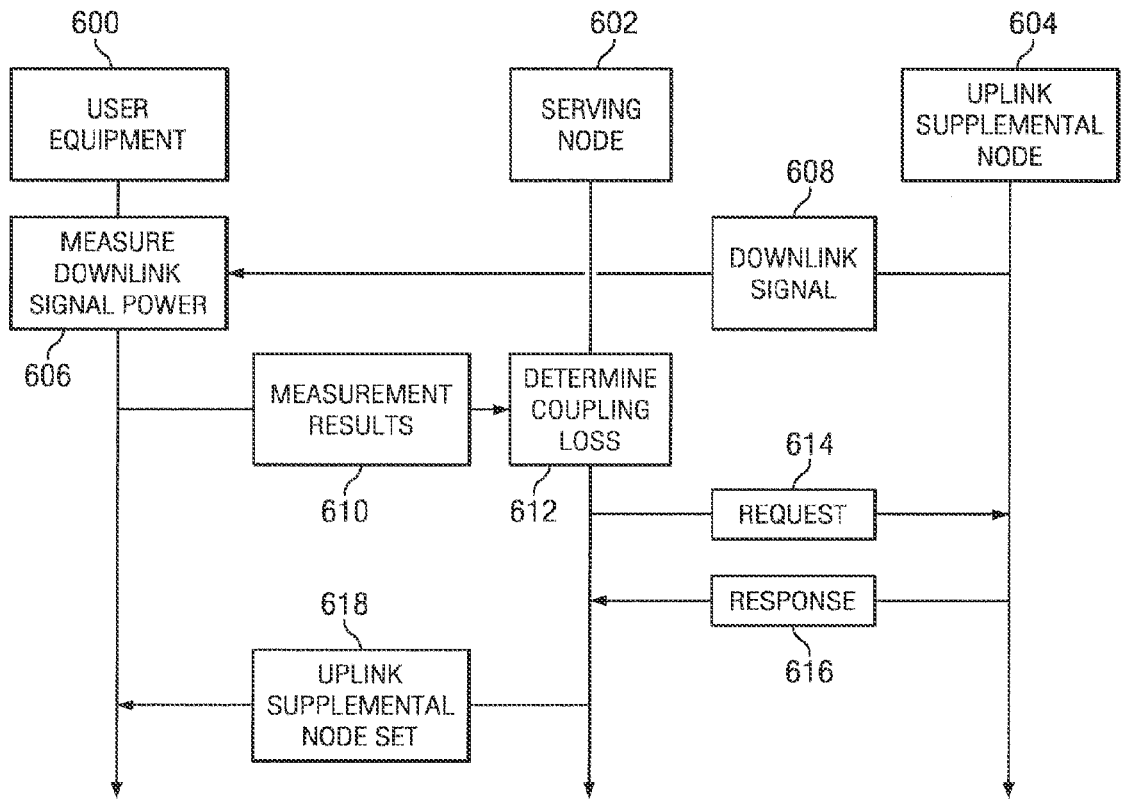
FIG. 6 is a diagram illustrating message flows in a method for selecting an uplink supplemental node in accordance with an illustrative embodiment.

FIG. 6 is a diagram illustrating message flows in a method for selecting an uplink supplemental node in accordance with an illustrative embodiment. The message flows illustrated in FIG. 6 are examples of message flows occurring in one implementation of step 506 of the method illustrated in the flowchart diagram of FIG. 5. FIG. 6 illustrates message flows between user equipment 600, serving node 602, and uplink supplemental node 604. The message flows illustrated in FIG. 6 begin after user equipment 600 has selected serving node 602 and communication between user equipment 600 and serving node 602 has been established.

Before the selection of uplink supplemental node 604 in accordance with an illustrative embodiment, user equipment 600 in communication with serving node 602 measures the downlink signal power 606 in downlink signal 608 received from network nodes that may be considered for operations as uplink supplemental node 604. Downlink signal power measurement 606 may be performed by user equipment 600 under guidance of serving node 602. Downlink signal power measurements 606 may be performed until a certain measurement event is satisfied, such as the measured signal power from a node crossing a specified threshold. Alternatively, downlink signal power measurements 606 may be performed for a selected time period.

When the measurement event is satisfied, or the selected time period expires, user equipment 600 reports the measurement results 610 obtained to serving node 602. For example, measurement results 610 may include the reference signal receive power, which represents the transmission power minus the coupling loss, for a number of nodes.

From the measurement results 610 received from user equipment 600, serving node 602 determines the coupling loss, 612 from user equipment 600 to the nodes. To determine the coupling loss 612, serving node 602 should be aware of the transmission power of the nodes. For example, the transmission power for an E-UTRAN Node B node may be 43 dBm while the transmission power for a Type I relay node may be 30 dBM or 36 dBm. Transmission power values may be exchanged between network nodes, including serving node 602, via the higher layer signaling, such as the X2 interface based signaling or other types of high layer signaling. The exchange of transmission power values may be done initially one time, and repeated only when the transmission power of a particular node is changed or a new network node is added, such as when a new relay node or other node is added to the network. In another embodiment, the exchange of transmission power values may be done periodically. Alternatively, serving node 602 may query the transmission power of another node that is under consideration for operation as uplink supplemental node 604 when it needs to determine the coupling loss for that particular node.

From the determined coupling loss, serving node 602 determines candidate uplink supplemental nodes. For example, if the coupling loss of a particular node is better than the coupling loss of serving node 602, then that particular node may be selected as one of the candidates for uplink supplemental node 604. Thus, there may be zero, one, or multiple candidate uplink supplemental nodes selected for user equipment 600.

In accordance with an illustrative embodiment, the combined link quality of the quality of the link from serving node 602 to a candidate node in combination with the quality of the link from the candidate node to user equipment 600 also may be considered when selecting candidate uplink supplemental nodes. The combined link quality may be used in addition to the quality of the link between the candidate node and user equipment 600, as represented by the coupling loss, to select candidate uplink supplemental nodes. Combined link quality also may be used when selecting downlink supplemental nodes, as described in more detail below.

After the uplink supplemental node candidate set is determined, serving node 602 sends request 614 to each candidate uplink supplemental node to determine whether or not it is appropriate for the node to operate as uplink supplemental node 604 for user equipment 600. Request 614 may be implemented as a query sent from serving node 602 to uplink supplemental node 604. Request 614 may be sent to candidate uplink supplemental nodes via the higher layer signaling, such as the radio resource control, RRC, signaling or X2 based signaling. The query may be followed by response 616 from candidate nodes that can operate as uplink supplemental node 604 for user equipment 600. This query-response procedure between serving node 602 and each candidate supplemental node may take place over the network backhaul or wireless backhaul.

At the end of the query-response procedure, an uplink supplemental node set 618 is determined. The uplink supplemental node set 618 is composed of uplink supplemental nodes for user equipment 600, and includes each candidate node that was determined to be appropriate for operation as an uplink supplemental node for user equipment 600. To limit the resources reserved by the uplink supplemental nodes, the number of uplink supplemental nodes in the uplink supplemental node set may be limited. For example, in a typical wireless network including Type I relay nodes, the uplink supplemental nodes will normally be relay nodes and the number of uplink supplemental nodes may be limited to one or two. Other limitations on the number of supplemental nodes may be used in other illustrative embodiments.

Thus, in accordance with an illustrative embodiment, the uplink supplemental node set 618 may contain zero, one, or multiple uplink supplemental nodes. For example, in a typical wireless network including Type-I relay nodes, the uplink supplemental node set 618 typically may include one uplink supplemental node and the one uplink supplemental node in the uplink supplemental node set 618 generally may be the relay node that is closest to user equipment 600.

In accordance with an illustrative embodiment, uplink supplemental node set 618 may or may not be transmitted to user equipment 600. If uplink supplemental node set 618 is sent to user equipment 600, dedicated radio resource control, RRC, signaling may be used to inform user equipment 600.

Figure 7:
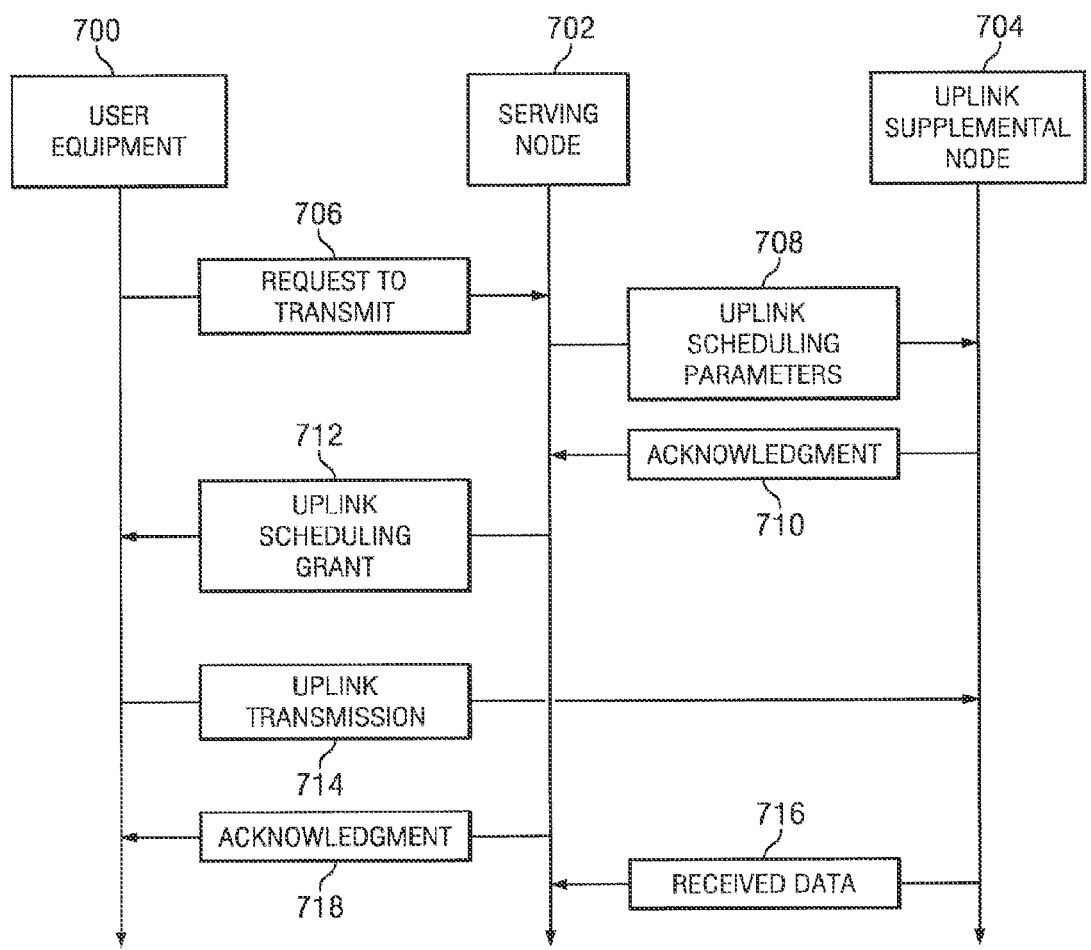
FIG. 7 is a diagram illustrating message flows in a method for using an uplink supplemental node in accordance with an illustrative embodiment.

FIG. 7 is a diagram illustrating message flows in a method for using an uplink supplemental node in accordance with an illustrative embodiment. The message flows illustrated in FIG. 7 are examples of message flows occurring in one implementation of step 508 of the method illustrated in the flow-chart diagram of FIG. 5. FIG. 7 illustrates message flows between user equipment 700, serving node 702, and uplink supplemental node 704. The message flows illustrated in FIG. 7 begin after supplemental node 704 has been selected for user equipment 700, such as in the manner described above.

Use of an uplink supplemental node in accordance with an illustrative embodiment begins when user equipment 700 requests to transmit on the uplink. For example, user equipment 700 may send request to transmit 706 to serving node 702 via a scheduling request channel. In response to receiving request to transmit 706 from user equipment 700, serving node 702 establishes uplink scheduling parameters 708. For example, in response to receiving request to transmit 706 from user equipment 700, serving node 702 may schedule uplink resource blocks, transmission time intervals, the modulation and coding scheme, and transmission modes for user equipment 700. Serving node sends uplink scheduling parameters 708 to each uplink supplemental node in the uplink supplemental node set. In response, each uplink supplemental node in the uplink supplemental node set prepares to receive the uplink transmission from user equipment 700 at the scheduled time. In accordance with an illustrative embodiment, serving node 702 may, but need not, receive acknowledgement 710 from each uplink supplemental node for the scheduling information provided by serving node 702. In the case where acknowledgment is enabled, each uplink supplemental node receiving scheduling parameters from serving node 702 will reply. This may be accomplished over the radio resource control, RRC, signaling or X2-based signaling.

To reduce interference or resource contention, serving node 702 and uplink supplemental node 704 preferably should avoid scheduling transmissions from other user equipment in the same cell during the scheduled transmission time interval for the indicated resource block. For example, in accordance with an illustrative embodiment, certain resource blocks may be reserved for uplink supplemental node operation. Such reserved resource blocks may define an uplink supplemental node "resource zone". Serving node 702 will then use the resource blocks from this resource zone when serving node 702 schedules user equipment transmissions that involve uplink supplemental node assistance. While uplink supplemental node 704 receives the scheduling parameters, it simply receives the uplink transmission, and there is no conflict. Alternatively, when uplink supplemental node 704 receives the scheduling parameters from serving node 702 it does not automatically schedule the indicated resource blocks in the indicated transmission time interval. If the indicated resource blocks are used by uplink supplemental node 704 for high priority transmissions, such as voice service, then uplink supplemental node 704 may notify serving node 702 that it will not be involved in uplink reception for the indicated transmission time interval.

The described method for preparing uplink supplemental node 704 to receive an uplink transmission from user equipment 700 may apply to single transmission time interval transmissions, as well as to semi-persistent scheduling and transmission time interval bundling. In the case of semi-persistent scheduling, the allocated uplink resources may periodically occur. When receiving scheduling parameters 708 from serving node 702 related to the semi-persistent scheduling resource activation, uplink supplemental node 704 may reserve all uplink semi-persistent scheduling resources periodically, in a manner similar to that described above. In the case of transmission time interval bundling, serving node 702 may let uplink supplemental node 704 know whether user equipment 700 is configured for subframe bundling operation. If user equipment 700 is in the subframe bundling mode, when receiving scheduling parameters 708 from serving node 702, uplink supplemental node 704 may reserve uplink resources for a selected number of consecutive subframes, such as for consecutive four subframes.

In accordance with an illustrative embodiment, when multi-user multiple-input and multiple-output is used in the uplink, uplink supplemental node 704 may still schedule the uplink transmissions during the transmission time interval provided by serving node 702 using the same resources. Uplink supplemental node 704 may also use coordinated beam forming to improve spectrum efficiency, by re-using the reserved resource blocks in the transmission time interval.

After preparing uplink supplemental node 704 to receive an uplink transmission from user equipment 700, serving node 702 sends uplink scheduling grant 712 to user equipment 700. Uplink scheduling grant 712 may be sent to user equipment 700 after serving node 702 receives an acknowledgement from each or at least one uplink supplemental node for the uplink scheduling parameter information received from serving node 702. In the case where acknowledgement is not enabled, serving node 702 may send uplink scheduling grant 712 to user equipment 700 a certain period of time after uplink scheduling parameter information is provided from serving node 702 to the uplink supplemental nodes.

After receiving uplink scheduling grant 712 from serving node 702, user equipment 700 performs uplink transmission 714. All participating uplink supplemental nodes receive and attempt to decode uplink transmission 714. Serving node 702 may or may not receive and decode uplink transmission 714 correctly. Uplink supplemental nodes that receive uplink transmission 714 successfully transmit received data 716 to serving node 702 via the backhaul. Assuming that uplink supplemental node 704 receives uplink transmission 714 from user equipment 700 successfully, it may take some time to deliver received data 716 to serving node 702. Therefore, serving node 702 preferably should allow a certain period of time in order to receive received data 716 from uplink supplemental node 704. In the case where multiple uplink supplemental nodes are participating in the transmission, if one uplink supplemental node has received uplink transmission 714 successfully, and delivered received data 716 to serving node 702, serving node 702 may signal uplink supplemental nodes that have not yet decoded the packet successfully to clear the data in their receiver buffer, such as in the hybrid automatic repeat request receiver buffer of uplink supplemental node 704.

In accordance with conventional practice, serving node 702 is supposed to send an acknowledgement or negative-acknowledgement of uplink transmission 714 to user equipment 700 a certain period of time, such as, for example, 4 ms, after user equipment 700 performs uplink transmission 714. In the case where uplink supplemental node 704 in accordance with an illustrative embodiment is in use, and serving node 702 may or may not receive uplink transmission 714 correctly or serving node 702 did not receive uplink transmission directly, it may be difficult for serving node 702 to decide within the allotted time period whether an acknowledgement or a negative-acknowledgement should be sent, due to the backhaul delay between serving node 702 and uplink supplemental node 704 receiving uplink transmission 714 from user equipment 700. In accordance with an illustrative embodiment, whenever an uplink supplemental node is in use, serving node 702 preferably always sends acknowledgement 718 of uplink transmission 714 to user equipment 700. For example, serving node 702 may send acknowledgement 718 to user equipment 700 via the physical hybrid automatic repeat request indicator channel, PHICH. In response, user equipment 700 will retain the uplink data, such as in the user equipment's hybrid automatic repeat request buffer. If serving node 702 eventually receives the uplink transmission data correctly, serving node 702 may schedule a new uplink transmission of new data from user equipment 700 by indicating a new transmission, for example, by toggling a new data indicator bit.

If serving node 702 does not receive received data 716 correctly from uplink supplemental node 704, serving node 702 may trigger a retransmission from user equipment 700. For example, serving node 702 may trigger an adaptive uplink hybrid automatic repeat request retransmission with a physical downlink control channel grant. When an adaptive uplink retransmission is to be triggered, serving node 702 preferably sends scheduling parameters 708 for the retransmission to the uplink supplemental nodes and requests the uplink reception from the uplink supplemental nodes, in the manner described above. Thus, if an uplink hybrid automatic repeat request retransmission is needed, the message flows illustrated in FIG. 7 are repeated until the uplink transmission data is correctly received or the maximum number of hybrid automatic repeat request transmissions is exceeded.

In accordance with an illustrative embodiment, any or all of the uplink supplemental nodes in an uplink supplemental node set may not participate in all uplink transmissions from user equipment 700. Whether or not uplink supplemental node 704 will participate in uplink transmission 714 may depend on such factors as the instantaneous loading at the time of uplink transmission 714 and traffic priority information.

Figure 8:
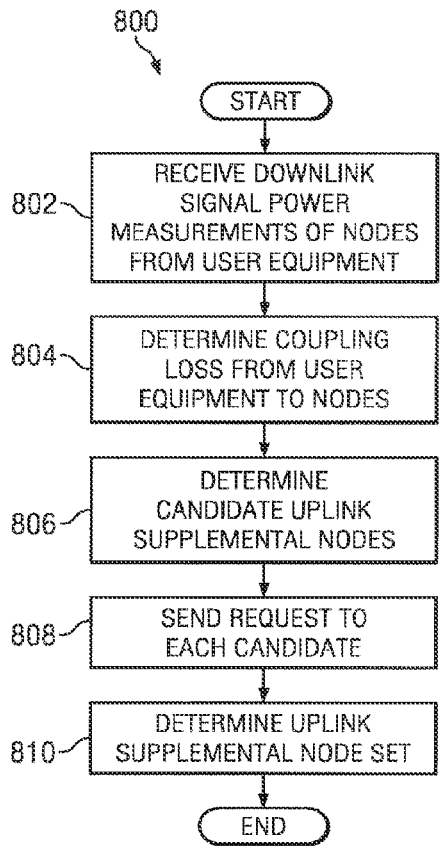
FIG. 8 is a flowchart of a method of selecting uplink supplemental nodes in accordance with an illustrative embodiment as implemented in a serving node.

In accordance with an illustrative embodiment, where at least one uplink supplemental node is in use, serving node 702 may or may not be involved in receiving uplink transmission 714 from user equipment 700. If the uplink/downlink imbalance between user equipment 700 and serving node 702 is not severe, both serving node 702 and uplink supplemental node 704 may be involved in receiving uplink transmission 714 from user equipment 700. However, serving node 702 may not be involved in receiving uplink transmission 714 in cases where the uplink/downlink imbalance between user equipment 700 and serving node 702 is particularly severe, such as exceeding 5 dB. In those cases where serving node 702 is not involved in receiving uplink transmission 714, serving node 702 may schedule the uplink transmission for user equipment 700 and transmit uplink scheduling parameters 708 to each uplink supplemental node. However, only the uplink supplemental nodes are involved in reception of uplink transmission 714. In this case, serving node 702 may schedule other users using the same resources in its own cell. Since the coupling loss with serving node 702 is quite large for user equipment 700 in this case, the uplink interference to other user equipment under serving node 702 will be quite small. In this case, serving node 702 will wait for an uplink transmission reception status indication from the uplink supplemental nodes. If uplink transmission 714 is received correctly by at least one of the uplink supplemental nodes, uplink transmission 714 is complete. Otherwise hybrid automatic repeat request retransmissions may be sent to other uplink supplemental nodes, with control signaling provided via serving node 702. FIG. 8 is an example of a method preformed in a survey node during one implementation of step 506 of the method illustrated in the flowchart diagram of FIG. 5.

FIG. 8 is a flowchart of method 800 of selecting uplink supplemental nodes in accordance with an illustrative embodiment as implemented in a serving node. FIG. 8 is an example of a method performed in a serving node during one implementation of step 506 of the method illustrated in the flow chart diagram of FIG. 5. The description of method 800 may be considered along with the description presented above of the message flows illustrated in FIG. 6.

Downlink signal power measurements for one or more nodes are received by the serving node from the user equipment (step 802). From the downlink signal power measurements received in step 802, the serving node determines the coupling loss from the user equipment to each of the nodes (step 804). As discussed above, to determine the coupling loss in step 804, the serving node should be aware of the transmission power of the nodes. From the determined coupling loss, the serving node determines candidate uplink supplemental nodes (step 806). For example, if the coupling loss of a particular node is better than the coupling loss of the serving node, then that particular node may be selected as one of the candidate uplink supplemental nodes. After the uplink supplemental node candidate set is determined at step 806, the serving node sends a request to each candidate uplink supplemental node to determine whether or not it is appropriate for the candidate node to operate as an uplink supplemental node for the user equipment (step 808). At the end of the query procedure of step 608, an uplink supplemental node set is determined (step 810). As discussed above, the uplink supplemental node set is composed of uplink supplemental nodes for the user equipment, and includes each candidate uplink supplemental node that was determined to be appropriate for operation as an uplink supplemental node for the user equipment.

Figure 9:
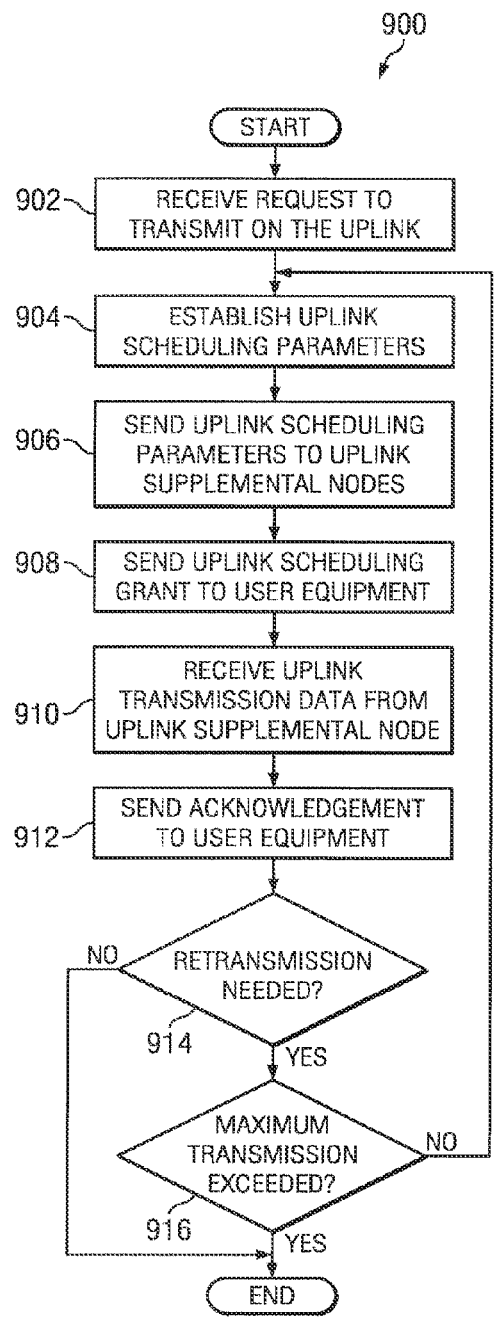
FIG. 9 is a flowchart of a method of using uplink supplemental nodes for transmission assistance in a wireless communications network in accordance with an illustrative embodiment, as implemented in a serving node.

FIG. 9 is a flowchart of method 900 of using uplink supplemental nodes for transmission assistance in a wireless communications network in accordance with an illustrative embodiment, as implemented in a serving node. FIG. 9 is an example of a method performed in a serving node during one implementation of step 508 of the method illustrated in the flowchart diagram of FIG. 5. The description of method 900 may be considered along with the description presented above of the message flows illustrated in FIG. 7.

Use of an uplink supplemental node in accordance with an illustrative embodiment begins when the serving node receives a request from the user equipment to transmit on the uplink (step 902). As discussed above, the user equipment may send a request to transmit to the serving node via a scheduling request channel. In response to receiving a request to transmit from the user equipment, the serving node establishes uplink scheduling parameters (step 904). For example, step 904 may include scheduling uplink resource blocks, transmission time intervals, the modulation and coding scheme, and transmission modes for the user equipment. Serving node sends the uplink scheduling parameters established in step 904 to each uplink supplemental node in the uplink supplemental node set (step 906). After preparing the uplink supplemental nodes to receive an uplink transmission from the user equipment, the serving node sends an uplink scheduling grant to the user equipment (step 908). As discussed above, step 908 may be performed after the serving node receives an acknowledgement from each or at least one uplink supplemental node for the uplink scheduling parameter information sent from the serving node in step 906, or after a certain period of time after the uplink scheduling parameter information is provided from the serving node to the uplink supplemental nodes in step 906.

The serving node receives uplink transmission data from uplink supplemental nodes that receive the uplink transmission from the user equipment successfully (step 910). In accordance with an illustrative embodiment, as described above, whenever an uplink supplemental node is in use, the serving node preferably always sends an acknowledgement of the uplink transmission to the user equipment (step 912). For example, step 912 may include sending an acknowledgement to the user equipment via the physical hybrid automatic repeat request indicator channel. If the serving node does not receive the uplink transmission data correctly from the uplink supplemental node, the serving node may determine that retransmission is required (step 914). If it is determined at step 914 that retransmission is required, it is determined whether a maximum number of allowed retransmissions is exceeded (step 916). If the maximum number of allowed retransmissions has not been exceeded, the serving node may trigger a retransmission from user equipment by returning to step 904. Thus, if a retransmission is needed, the steps of method 900 beginning with step 904 are repeated until the uplink transmission data is correctly received or the maximum number of retransmissions is exceeded.

Link adaptation refers to the matching of the modulation and coding scheme used in a wireless connection to the conditions on the radio link. The process of link adaptation is a dynamic one, and modulation and coding scheme parameters may change as the radio link conditions change. In accordance with an illustrative embodiment, link adaptation of the uplink channel between the user equipment and an uplink supplemental node may be controlled by the serving node.

Figure 10:
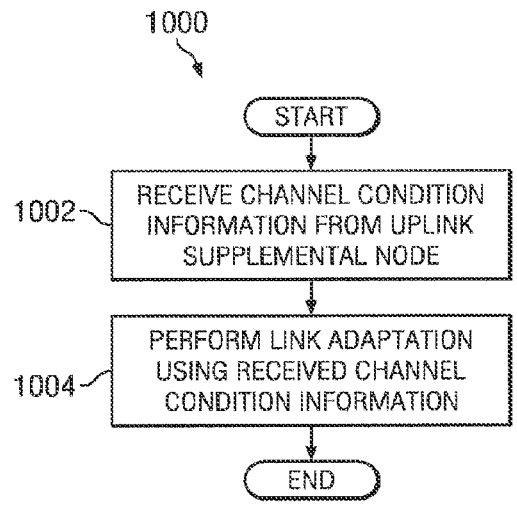
FIG. 10 is a flowchart of a method of rate adaptation as implemented in a serving node in accordance with an illustrative embodiment.

FIG. 10 is a flowchart of method 1000 of rate adaptation as implemented in a serving node in accordance with an illustrative embodiment. In method 1000, the serving node performs rate adaptation of the uplink channel used by user equipment for uplink transmissions to an uplink supplemental node based on channel condition information provided by the uplink supplemental node.

Efficient link adaptation may be achieved if the serving node has good knowledge of the condition of the uplink channel between the user equipment and the uplink supplemental node. In accordance with an illustrative embodiment, an uplink supplemental node may measure the condition of the uplink channel between the uplink supplemental node and the user equipment and report the channel condition to the serving node. The serving node receives the channel condition information from the uplink supplemental node (step 1002).

The uplink channel condition measurement may be based on the uplink transmission data or sounding reference signal transmissions from the user equipment. If sounding reference signal transmissions are used, the serving node may provide the sounding reference signal configuration information to the uplink supplemental node.

The uplink supplemental node may report uplink channel conditions to the serving node based on the occurrence of channel condition changes or other triggers. For example, the uplink supplemental node may report uplink channel conditions to the serving node initially and then again whenever channel conditions change by more than a selected amount. Alternatively, the uplink supplemental node may report channel conditions to the serving node periodically based on one or more timers. In the case of periodic reporting, the timer value used for establishing the reporting period may be selected based, at least in part, on the user equipment speed. Thus, if the user equipment is moving rapidly, channel conditions are likely to change more rapidly, and a shorter time period between uplink channel condition reports to the serving node would be appropriate.

The serving node performs link adaptation of the uplink channel used for uplink transmissions from the user equipment to the uplink supplemental nodes using the received channel condition information (step 1004). In cases where the condition of the uplink channel between the user equipment and the uplink supplemental node is provided to the serving node, much more efficient link adaptation may be achieved. For example, spatial multiplexing, beam forming, or multi-user multiple-input and multiple-output may be applied to improve the spectrum efficiency.

Due to delay over the backhaul, uplink channel conditions reported to the serving node may not be entirely accurate. In particular, uplink channel conditions reported to the serving node are likely to be most inaccurate under fast changing channel conditions, such as under fast fading channel conditions. However, uplink channel conditions reported to the serving node may still be useful for slow link adaptation, such as in the manner described below, with slow speed user equipment.

Figure 11:
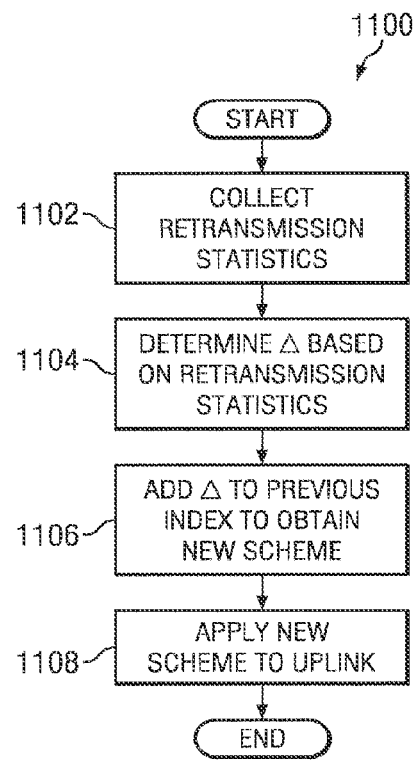
FIG. 11 is a flowchart of an alternative method of rate adaptation as implemented in a serving node in accordance with an illustrative embodiment.

FIG. 11 is a flowchart of method 1100 of rate adaptation as implemented in a serving node in accordance with an illustrative embodiment. In method 1100, the serving node performs rate adaptation of the uplink channel used by user equipment for uplink transmissions to an uplink supplemental node based on retransmission statistics collected by the serving node.

In accordance with an illustrative embodiment, the serving node generally may not be aware of changing link conditions between the uplink supplemental node and the user equipment. Hence, the modulation and coding scheme assigned for a user equipment uplink transmission to the serving node may be very different from the modulation and coding scheme that would best be used between the user equipment and the uplink supplemental node. In the case where the serving node is not involved in uplink reception, this could lead to lower than necessary data rates.

In accordance with an illustrative embodiment, the serving node collects retransmission statistics, such as hybrid automatic repeat request retransmission statistics, from the uplink supplemental node (step 1102). Step 1102 may include the collection of retransmission statistics using a timer or using a sliding window.

Figure 12:
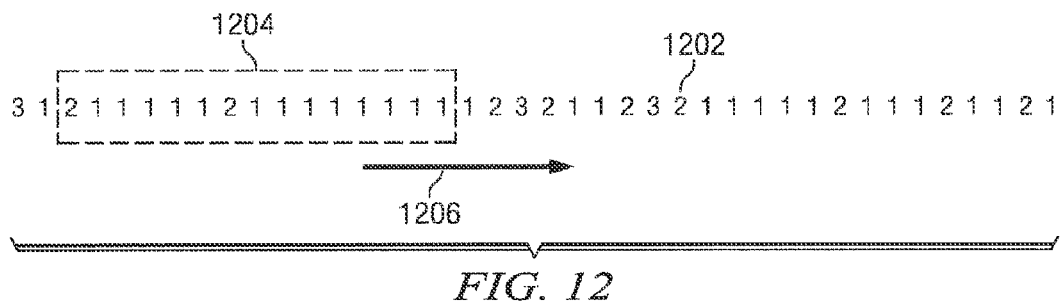
FIG. 12 illustrates an example of obtaining hybrid automatic repeat request transmission statistics using a sliding window technique in accordance with an illustrative embodiment.

FIG. 12 illustrates an example of obtaining hybrid automatic repeat request retransmission statistics using a sliding window technique in accordance with an illustrative embodiment. Each number 1202 in FIG. 12 represents the number of hybrid automatic repeat request transmissions required for a particular uplink transmission to be received correctly at an uplink supplemental node. Window 1204 encompasses a selected number of transmission numbers 1202. For example, the length of window 1204, defining the selected number of transmission numbers 1202 encompassed by window 1204, may be selected to encompass 15 transmission numbers 1202. Any other desired length for window 1204 may be used in accordance with illustrative embodiments. As time progresses, window 1204 slides in the direction indicated by arrow 1206 to encompass the most recent transmission numbers 1202. Uplink transmission numbers 1202 encompassed by window 1204 at a given time instance are averaged to obtain the hybrid automatic repeat request retransmission statistics for the time instance. In the example presented in FIG. 12, the average of hybrid automatic repeat request transmissions at the time instance represented by the illustrated position of window 1204 is approximately 1.1. In accordance with an illustrative embodiment, the serving node may update the retransmission statistics obtained by the method described and perform slow link adaptation based on the retransmission statistics.

The serving node provides slow link adaptation of the uplink channel based on the collected retransmission statistics. In the case where the serving node is involved in receiving the uplink transmission, the serving node will have first determined a modulation and coding scheme index based on the uplink transmitted sounding reference signal and the power headroom report. In the case where the serving node is not involved in receiving the uplink transmission, the serving node will have first determined the modulation and coding scheme based on the calculated coupling loss between the uplink supplemental node and the user equipment and determined an initial modulation and coding scheme index. In either case, a delta value is determined based on the retransmission statistics as determined above (step 1104). For example, if the determined hybrid automatic repeat request retransmission statistic is below a certain threshold, the delta value may be a positive number, such as +1 or +2. If the retransmission statistic is above a certain threshold value, the delta value may be a negative number, such as −1 or −2.

The serving node adds the calculated delta value to the previously determined modulation and coding scheme index value to obtain the new modulation and coding scheme to be used for uplink transmissions (step 1106). The new modulation and coding scheme then is applied to the uplink channel (step 1108). Thus, data rates may slowly be increased as long as the retransmission statistics indicate that the average number of retransmissions required to deliver successfully an uplink transmission is not increased by too much. Similarly, data rates are reduced when the average number of retransmissions required to deliver successfully an uplink transmission is too high.

For applications in which user throughput needs to be maximized, additional consideration may be needed to decide whether link adaptation should be based on the link between the user equipment and the serving node, the link between the user equipment and the uplink supplemental node, or the combination of these two links. The user equipment may use a higher data rate modulation and coding scheme if the link adaptation is based on the link between the user equipment and the uplink supplemental node or the combination of links, since the uplink signal on this link is stronger. However, it takes extra time for the uplink supplemental node to relay a received uplink transmission data packet to the serving node, thereby affecting overall throughput. Therefore, in accordance with an illustrative embodiment, overall throughput may be taken into account in determining upon which link a link adaptation scheme is to be based.

In accordance with an illustrative embodiment, the serving node may control user equipment transmission power using retransmission statistics determined in the manner described above. For example, when the average hybrid automatic repeat request retransmission statistic is below a selected threshold value, the serving node may send a transmission power control command to the user equipment to reduce the user equipment transmission power over the physical uplink shared channel. It should be noted that, in this case, the physical uplink control channel transmission power may not be able to be reduced, since the physical uplink control channel still needs to reach the serving node. When the average hybrid automatic repeat request retransmission statistic is above a selected threshold value, the serving node may send a transmission power control command to the user equipment to increase the user equipment transmission power over the physical uplink shared channel.

In the examples presented above, the selection and operation of an uplink supplemental node for providing transmission assistance in an uplink direction from user equipment to a wireless network is described in detail. However, it should be understood that a supplemental node for providing transmission assistance in accordance with an illustrative embodiment may be a downlink supplemental node for providing transmission assistance in a downlink direction to user equipment from a wireless network. The selection and use of a downlink supplemental node in accordance with an illustrative embodiment may follow that described in detail above for an uplink supplemental node, with appropriate modification as will be apparent to those skilled in the art based upon the detailed description provided herein.

In accordance with an illustrative embodiment, a downlink supplemental node will assist downlink related transmissions to user equipment from a wireless network and may perform certain related operations under the guidance of the serving node. A downlink supplemental node in accordance with an illustrative embodiment will not assist with uplink related operations. Use of a downlink supplemental node in accordance with an illustrative embodiment provides several advantages. When a downlink supplemental node is used for downlink transmissions, the uplink transmission has better performance, since the serving node selection is based on the coupling loss. All uplink transmissions are made to the serving node. The user equipment does not need to transmit on the uplink to the downlink supplemental node, which may save user equipment battery power.

Either a standard network node, such as an E-UTRAN Node B node, or a relay node may be selected to operate as a downlink supplemental node in accordance with an illustrative embodiment. If user equipment selects a relay node as the serving node, based on the minimum coupling loss, the donor E-UTRAN Node B node may be selected to operate as a downlink supplemental node to assist the serving node with downlink transmissions to the user equipment. In this case, the serving node may not need to forward the downlink transmission data to the downlink supplemental node, since the data is originally forwarded by the donor node operating as the downlink supplemental node to the relay node operating as the serving node, and the donor node may keep a copy of the data.

In accordance with an illustrative embodiment, the downlink grant is transmitted from the serving node. The physical downlink shared channel is transmitted from the downlink supplemental node. In accordance with an illustrative embodiment, the data in a downlink transmission from the downlink supplemental node may or may not be transmitted from the serving node simultaneously.

In accordance with an illustrative embodiment, link adaptation of the downlink between a downlink supplemental node and user equipment may be based on channel quality indicator, pre-coding matrix indicator, and rank indication feedback from the user equipment to the serving node. In the case where the serving node is not involved in downlink transmissions, the serving node may deliver received channel quality indicator, pre-coding matrix indicator, and rank indication feedback to the downlink supplemental node. The downlink supplemental node will perform the scheduling function, and then send back to the serving node for the physical downlink control channel transmission. More aggressive modulation and coding schemes may be selected by the serving node for the downlink transmission, considering that the downlink supplemental node will assist the downlink data transmission. Alternatively, the user equipment may measure the quality of the downlink between the downlink supplemental node and the user equipment and report the downlink quality back to the serving node so that the serving node may make more appropriate modulation and coding scheme selections. Signaling exchanges between the serving node and the downlink supplemental node are completed via the backhaul communication.

Simulations were performed to verify the performance of supplemental node transmission assistance in accordance with illustrative embodiments. The simulation parameters used are shown in Table I.

TABLE I

Simulation Parameters

| Parameter | Assumption/Value |
| --- | --- |
| Cellular layout | Hexagonal grid, 19 macro eNB, 3 sectors per cell, wrapped-around |
| Relay layout | 2 RNs per sector at 3/3 of cell radius |
| Inter-site distance (ISD) | 1732 m (Case 3) |
| Distance-dependent path loss for eNB→UE | L □ 128, t + 37.6$\log_{10}$(R), R in kilometers |
| Distance-dependent path loss for RN→UE | L = Prob(R) $PL_{LOS}$(R) + [1 − Prob(R)]$PL_{NLOS}$(R) For 2 GHz, R in km<br>Where,<br>$PL_{LOS}$(R) = 103.8 + 20.9log10(R)<br>$PL_{NLOS}$(R) = 145.4 + 37.5log10(R)<br>Case 3: Prob(R) = 0.5 min (0.5.3exp(−0.3(R)) − min (0.5.3exp(−R 0 095)) |
| Distance-dependent path loss for eNB→relay | L = Prob(R)$PL_{LOS}$(R) + [1 − Prob(R)]$PL_{NLOS}$(R), R in km<br>$PL_{LOS}$(R) = 100.7 + 23.5log10(R)<br>$PL_{NLOS}$(R) = 125.2 + 36.3log10(R)<br>Case 3: Prob(R) = exp(−(R −0.01) 1.0) |
| Shadowing standard deviation | 10 dB (RN to UF); 8 dB (eNB to UE), 6 dB (eNB to RN) |
| Shadowing correlation | 0.5 between sites (including eNB and RN); 1 between sectors per site |
| Penetration loss | 20 dB from eNB to UE, 20 dB from RN to UE, 0 dB from eNB to RN |
| Antenna patters for macro eNBs to UEs (horizontal) | $A(\theta) = -\min\left[12\left(\frac{\theta}{\theta_{3dB}}\right)^2, A_m\right]$<br><br>$\theta_{3dB}$ = 70 degrees, $A_m$ = 25 dB (70 degree horizontal beamwidth) |
| Antenna pattern for macro eNBs to UEs (vertical) | $A(\theta) = -\min\left[12\left(\frac{\theta - \theta_{eNB}}{\theta_{3dB}}\right)^2, (SLA)_v\right]$<br><br>$\theta_{3dB}$ = 10 degrees, SLAv = 20 dB, antenna downtilt 6 degrees for Case 3 |
| Combining method in 3D antenna pattern | $A(\phi, \theta) = -\min\{-[A_H(\phi) + A_P(\theta)] A_m\}$ |
| Antenna pattern for relays to UEs (horizontal) | 0 dB for all directions |
| Carrier frequency | 2 GHz |
| Bandwidth | 10 MHz |
| Minimum distance between UE and eNB/RN | 35 m between UE and eNB. 10 m between UE and RN |
| Tx power | 46 dBm for eNB, 30 dBm for RN |
| BS antenna gain (incl. cable loss) | 14 dBi |
| Relay antenna gain (incl. cable loss) | 5 dBi |
| UE antenna gain | 0 dBi |
| UE noise figure | 9 dB |
| eNB noise figure | 5 dB |
| Fast fading | Disabled |
| USN/DSN selection threshold | 5 dB |
| Handover Margin | 1 dB |

Figure 13:
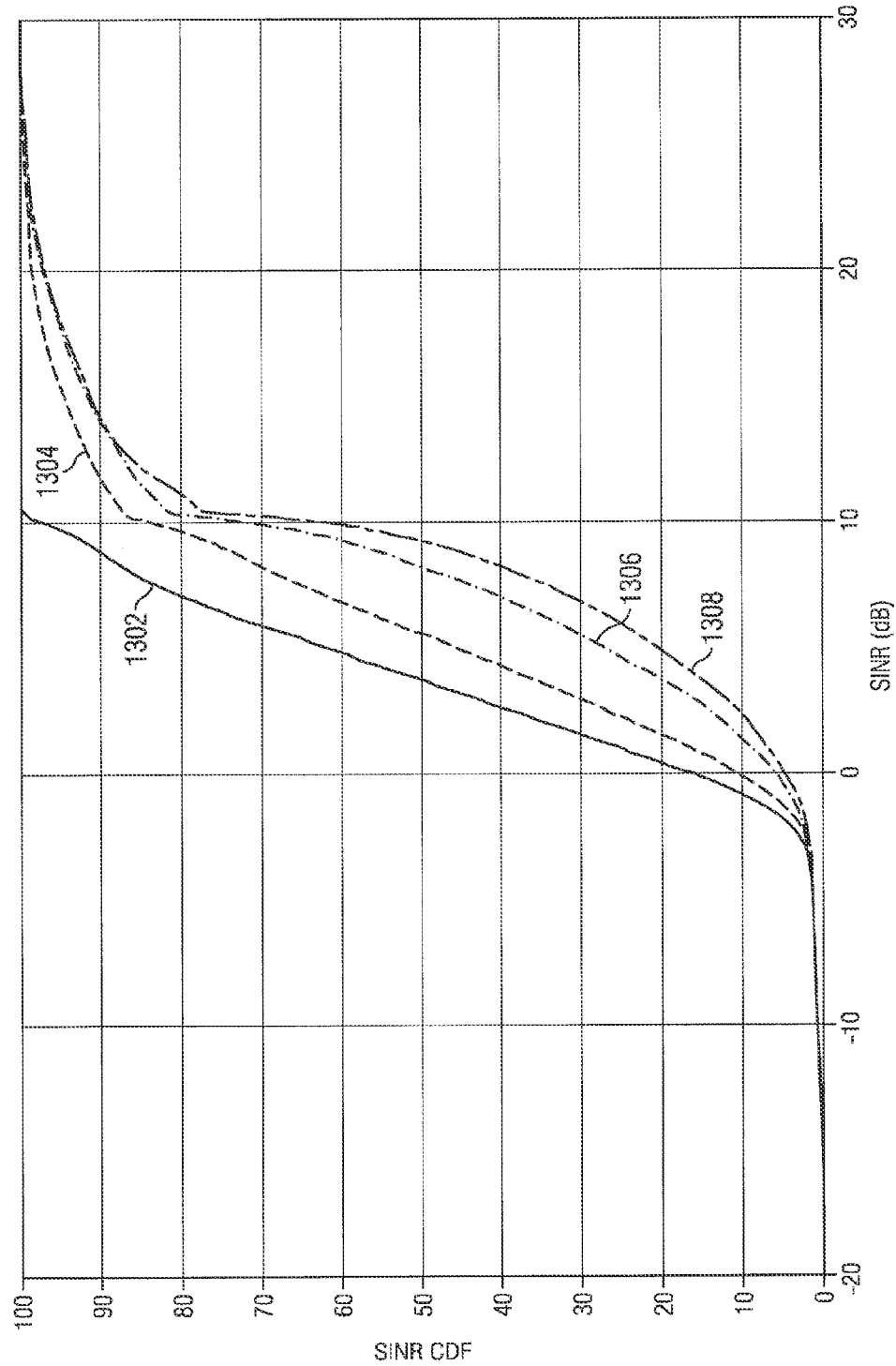
FIG. 13 is a chart illustrating simulated signal to interference-plus-noise ratio performance enhancement using an uplink supplemental node for transmission assistance in a wireless communications network in accordance with an illustrative embodiment.

Simulation results showing signal to interference-plus-noise ratio performance enhancement with uplink supplemental node use in accordance with an illustrative embodiment are illustrated in FIG. 13. FIG. 13 shows simulated uplink signal to interference-plus-noise cumulative distribution functions for simulations including a single E-UTRAN Node B node and various numbers of Type I relay nodes. Line 1302 shows simulation results for the case with two relay nodes without the use of uplink supplemental nodes. Line 1304 shows simulation results for the case with two relay nodes with uplink supplemental nodes in accordance with an illustrative embodiment. Line 1306 shows simulation results for the case with four relay nodes with uplink supplemental nodes in accordance with an illustrative embodiment. Line 1308 shows simulation results for the case with eight relay nodes with uplink supplemental nodes in accordance with an illustrative embodiment.

It can be seen from FIG. 13 that by adding uplink supplemental nodes for uplink transmission assistance in accordance with an illustrative embodiment the signal to interference-plus-noise cumulative distribution function is improved overall, especially for users at the cell edge. Increasing the number of relay nodes, and thus increasing the number of potential uplink supplemental nodes, further enhances the received signal to interference-plus-noise ratio. By increasing the number of relay nodes, more nodes can be included in the uplink supplemental node set and interference is reduced, since more user equipments are associated with the relay nodes and use less transmit power. However, the gain becomes less substantial as the number of uplink supplemental nodes increases.

Figure 14:
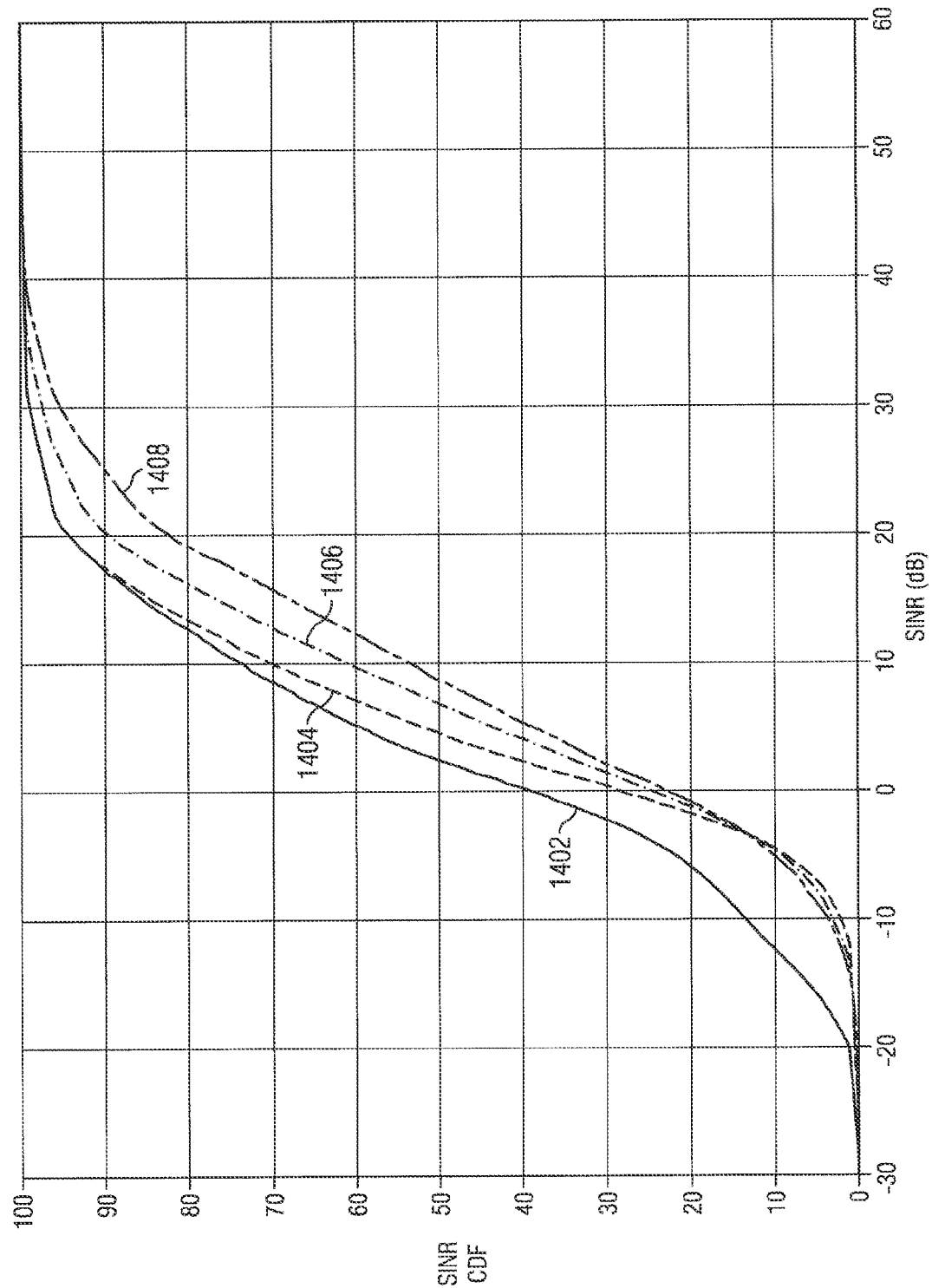
FIG. 14 is a chart illustrating simulated signal to interference-plus-noise ratio performance enhancement using a downlink supplemental node for transmission assistance in a wireless communications network in accordance with an illustrative embodiment.

Simulation results showing signal to interference-plus-noise ratio performance enhancement with downlink supplemental node use in accordance with an illustrative embodiment are illustrated in FIG. 14. FIG. 14 shows simulated downlink signal to interference-plus-noise cumulative distribution functions for simulations including a single E-UTRAN Node B node and various numbers of Type I relay nodes. Line 1402 shows simulation results for the case with two relay nodes without the use of downlink supplemental nodes. Line 1404 shows simulation results for the case with two relay nodes with downlink supplemental nodes in accordance with an illustrative embodiment. Line 1406 shows simulation results for the case with four relay nodes with downlink supplemental nodes in accordance with an illustrative embodiment. Line 1408 shows simulation results for the case with eight relay nodes with downlink supplemental nodes in accordance with an illustrative embodiment.

FIG. 14 shows that performance gain using a downlink supplemental node for downlink transmission assistance in accordance with an illustrative embodiment is similar to that obtained using an uplink supplemental node for uplink transmission assistance in accordance with an illustrative embodiment. Assuming, in this case, that the user equipment association with a serving node is based on the uplink coupling loss, it can be seen that by applying the downlink supplemental node about 8 dB signal to interference-plus-noise ratio gain can be achieved at the downlink and more than 50% of user equipment can achieve more than 2 dB signal to interference-plus-noise ratio gains at the downlink. With an increased number of relay nodes, more nodes may be included in the downlink supplemental node set, resulting in further improvement of the received signal to interference-plus-noise ratio at the user equipment.

One or more of the illustrative embodiments thus provides for transmissions between a wireless network and wireless user equipment in a first direction using a serving node of the wireless network while providing for transmissions between the wireless network and wireless user equipment in a second direction using a supplemental node of the wireless network. The supplemental node is selected based on providing better channel conditions between the network and the user equipment in the second direction than the serving node. The supplemental node thus provides transmission assistance for the serving node in order to provide the best available downlink and uplink communications between the user equipment and the network.

The flowcharts and block diagrams in the different depicted embodiments illustrate the architecture, functionality, and operation of some possible implementations of apparatus and methods in different illustrative embodiments. In this regard, each block in the flowchart or block diagrams may represent a module, segment, function, or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or to limit the embodiments to the form disclosed. Many modifications and variations will be apparent to those of ordinary skill in the art. In the illustrative examples, the user equipment has been described with respect to a mobile phone. The different illustrative embodiments may be applied to other types of platforms in addition to or in place of the ones described, such as a mobile platform, a stationary platform, a land-based structure, an aquatic-based structure, a space-based structure, a smart phone, a personal digital assistant, a desktop computer, a server computer, a set-top box, a game console, a workstation, and any other suitable platform. A component may be included in a platform in a number of different ways. For example, the component may be located inside the platform, outside of the platform, formed as part of the platform, mechanically secured to the platform, or otherwise associated with the platform.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of wireless communications between a wireless communications network and a wireless user equipment, comprising:
   identifying, by the wireless communications network, a first node of the wireless communications network as a serving node for the wireless user equipment, the serving node for transmissions in a first direction between the wireless user equipment and the wireless communications network, the serving node comprising a serving base station;
   identifying, by the wireless communications network, a second node of the wireless communications network as a supplemental node;
   using, by the wireless communications network, the supplemental node for transmissions in a second direction between the wireless communications network and the user equipment;
   wherein the serving node is configured to provide scheduling parameters to the supplemental node;

wherein identifying the second node includes identifying the second node of the wireless communications network that receives a stronger uplink signal from the wireless user equipment than the uplink signal received at the serving node from the user equipment, as the supplemental node;

wherein transmissions in the first direction are downlink transmissions from the serving node to the user equipment;

wherein transmissions in the second direction are uplink transmissions from the user equipment to the supplemental node;

wherein identifying the second node as the supplemental node further includes identifying a plurality of additional nodes of the wireless communications network as a plurality of uplink supplemental nodes forming an uplink supplemental node set; and wherein using the supplemental node for transmissions in the second direction between the wireless communications network and the wireless user equipment includes receiving uplink transmissions from the wireless user equipment by the plurality of the uplink supplemental nodes in the uplink supplemental node set.

2. The method of claim 1, wherein the first node and the second node are wireless communications network nodes selected from a group of wireless communications network nodes consisting of E-UTRAN Node B nodes, relay nodes, and other low power transmission nodes.

3. The method of claim 1, further comprising adapting parameters of a wireless communications link for the transmissions in the second direction by the serving node.

4. The method of claim 3, comprising determining retransmission statistics for transmissions in the second direction and adapting parameters of the wireless communications link for the transmissions in the second direction based on the determined retransmission statistics.

5. An apparatus for wireless communications with user equipment, the apparatus comprising:

a first access node adapted for transmissions in a first direction and a second direction between the user equipment and a wireless communications network, the first access node adapted to select a second access node for transmissions in one of the first direction or the second direction based, at least in part, on a channel signal strength between the second access node and the user equipment, wherein the first access node comprises a serving base station, and wherein the first access node is adapted to send scheduling parameters from the first access node to the second access node;

wherein transmissions in the first direction are downlink transmissions from the first access node to the user equipment; the second access node is a supplemental node, and transmissions in the second direction are uplink transmissions from the user equipment to the supplemental node;

wherein the first access node is further adapted to select a plurality of nodes of the wireless communications network as a plurality of uplink supplemental nodes forming an uplink supplemental node set; and wherein the plurality of the uplink supplemental nodes in the uplink supplemental node set are configured to receive uplink transmissions from the user equipment for transmissions in the second direction.

6. The apparatus of claim 5, wherein the first access node is a wireless communications network node selected from a group of wireless communications network nodes consisting of E-UTRAN Node B nodes, relay nodes, and other low power transmission nodes.

7. The apparatus of claim 5, wherein the first access node is configured to adapt parameters of a wireless communications link for the transmissions in the second direction.

8. The apparatus of claim 7, wherein the first access node is adapted to determine retransmission statistics for transmissions in the second direction and to adapt parameters of the wireless communications link for the transmissions in the second direction on the determined retransmission statistics.

9. An apparatus for providing communications services to a wireless user equipment, comprising:

a processor configured to identify a first node of a wireless communications network as a serving node for the user equipment, the first node comprising a serving base station;

wherein the processor is further configured to identify a second node of the wireless communications network as a supplemental node, use the serving node for transmissions in a first direction between the user equipment and the wireless communications network, and use the supplemental node for transmissions in a second direction between the wireless communications network and the user equipment;

wherein the serving node is configured to provide scheduling parameters to the supplemental node;

wherein identifying the second node includes identifying the second node of the wireless communications network that receives a stronger uplink signal from the wireless user equipment than the uplink signal received at the serving node from the user equipment, as the supplemental node;

wherein transmissions in the first direction are downlink transmissions from the serving node to the user equipment;

wherein transmissions in the second direction are uplink transmissions from the user equipment to the supplemental node;

wherein identifying the second node as the supplemental node further includes identifying a plurality of additional nodes of the wireless communications network as a plurality of uplink supplemental nodes forming an uplink supplemental node set; and wherein using the supplemental node for transmissions in the second direction between the wireless communications network and the wireless user equipment includes receiving uplink transmissions from the wireless user equipment by the plurality of the uplink supplemental nodes in the uplink supplemental node set.

10. The apparatus of claim 9, wherein the first node and the second node of the wireless communications network are selected from a group of wireless communications network nodes consisting of E-UTRAN Node B nodes, relay nodes, and other low power transmission nodes.

11. A method of wireless communications between a wireless communications network and a user equipment, comprising:

selecting, by the wireless communications network, a first access node adapted for transmissions in a first direction and a second direction between the user equipment and the wireless communications network;

selecting, by the first access node, a second access node for transmissions in one of the first direction or the second direction based, at least in part, on a channel signal strength between the second access node and the user equipment;

wherein the first access node is adapted to send scheduling parameters from the first access node to the second access node;

wherein transmissions in the first direction are downlink transmissions; and transmissions in the second direction are uplink transmissions from the user equipment to the wireless communications network;

wherein selecting the second access node comprises selecting a plurality of nodes of the wireless communications network as a plurality of uplink supplemental nodes forming a uplink supplemental node set; and wherein the plurality of the uplink supplemental nodes in the uplink supplemental node set are configured to transmit uplink transmissions from the user equipment for transmissions in the second direction.

12. The method of claim 11, wherein the first access node is a wireless communications network node selected from a group of wireless communications network nodes consisting of E-UTRAN Node B nodes, relay nodes, and other low power transmission nodes.

13. The method of claim 11, wherein the first access node is configured to adapt parameters of a wireless communications link for the transmissions in the second direction.

14. A user equipment for wireless communications with a communications network, comprising:

a transceiver configured to establish transmissions with a first access node in a first direction or a second direction, the first access node comprising a serving base station;

wherein the transceiver is configured to establish transmission with a second access node in one of the first or second directions based, at least in part, on a channel signal strength between the user equipment and the second access node;

wherein the first access node is adapted to send scheduling parameters from the first access node to the second access node;

wherein transmissions in the first direction are downlink transmissions to the user equipment from the first access node; and transmissions in the second direction are uplink transmissions to the second access node from the user equipment;

wherein the first access node is further adapted to select a plurality of nodes of the wireless communications network as a plurality of uplink supplemental nodes forming an uplink supplemental node set; and wherein the transceiver is configured to transmit uplink transmissions to the plurality of the uplink supplemental nodes in the uplink supplemental node set.

* * * * *